United States Patent
Asai et al.

(10) Patent No.: US 10,949,996 B2
(45) Date of Patent: Mar. 16, 2021

(54) SELF-POSITION ESTIMATION APPARATUS

(71) Applicant: AISIN SEIKI KABUSHIKI KAISHA, Kariya (JP)

(72) Inventors: Shoji Asai, Nagakute (JP); Shu Asami, Nagakute (JP); Yoshikazu Hattori, Nagakute (JP); Hiroshi Ishiguro, Kariya (JP); Kazutaka Hayakawa, Anjo (JP); Takashi Suzuki, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 117 days.

(21) Appl. No.: 16/248,191

(22) Filed: Jan. 15, 2019

(65) Prior Publication Data
US 2019/0220997 A1 Jul. 18, 2019

(30) Foreign Application Priority Data

Jan. 16, 2018 (JP) .............................. JP2018-005012
Jan. 30, 2018 (JP) .............................. JP2018-013946
Feb. 13, 2018 (JP) .............................. JP2018-023303

(51) Int. Cl.
*G01C 21/28* (2006.01)
*G06F 16/29* (2019.01)
(Continued)

(52) U.S. Cl.
CPC ............ *G06T 7/74* (2017.01); *G01C 21/28* (2013.01); *G01C 21/32* (2013.01); *G06F 16/29* (2019.01);
(Continued)

(58) Field of Classification Search
CPC ......... G01C 21/32; G01C 21/28; G06F 16/29; G06T 2207/30244; G06T 2207/30252;
(Continued)

(56) References Cited

U.S. PATENT DOCUMENTS

2006/0013438 A1* 1/2006 Kubota .............. G06K 9/00805
382/103
2008/0253606 A1* 10/2008 Fujimaki .................. G06T 7/85
382/100
(Continued)

FOREIGN PATENT DOCUMENTS

JP 2017-138664 A 8/2017

OTHER PUBLICATIONS

Raúl Mur-Artal et al. "ORB-SLAM: a Versatile and Accurate Monocular SLAM System". IEEE Transactions on Robotics, 2015, pp. 1147-1163, vol. 31, No. 5.

*Primary Examiner* — Charles T Shedrick
(74) *Attorney, Agent, or Firm* — Sughrue Mion, PLLC

(57) ABSTRACT

A self-position estimation apparatus includes an image capturing unit capturing driving images and reference images at a plurality of positions along a predetermined driving route, a detection unit detecting feature points on each of the driving images and feature points on each of the reference images, a storage unit storing map information which includes the feature points on each of the reference images and a position and a posture of the image capturing unit at a time each of the reference images is captured by the image capturing unit, and an estimation unit selecting a similar image similar to one of the driving images from the reference images to correlate the feature points on the one of the driving images and feature points on the similar image, the estimation unit estimating a position and a posture of an own vehicle a predetermined driving route based on a correlation result.

11 Claims, 20 Drawing Sheets

(51) Int. Cl.
*G01C 21/32* (2006.01)
*G06T 7/73* (2017.01)

(52) U.S. Cl.
CPC .............. *G06T 2207/30244* (2013.01); *G06T 2207/30252* (2013.01)

(58) Field of Classification Search
CPC ............. G06T 7/74; G06T 2207/10016; G06T 2207/30261; G06T 7/73; G01S 19/48
See application file for complete search history.

(56) References Cited

U.S. PATENT DOCUMENTS

| | | | | |
|---|---|---|---|---|
| 2012/0268602 | A1* | 10/2012 | Hirai | G06T 7/12 348/148 |
| 2013/0128001 | A1* | 5/2013 | You | G06K 9/00208 348/47 |
| 2018/0047147 | A1* | 2/2018 | Viswanathan | G06T 7/269 |
| 2019/0039605 | A1* | 2/2019 | Iio | G08G 1/16 |

* cited by examiner

Similar keyframe    Driving image

FIG. 5

| Feature point in driving image | ORB feature | Hamming distance |
|---|---|---|
| 1 | 01101101 | |
| 2 | 0100<u>1010</u> | 4 |
| ... | 0100<u>1001</u> | 2 |
| | ... | ... |

Feature point in similar keyframe

Minimum value is employed as distance between feature values

FIG. 7

| Index of feature value (Registered) | Index of feature value (Addition) | | | | |
|---|---|---|---|---|---|
| | 1 | 2 | 3 | 4 | 5 |
| 1 | 0 | 15 | 9 | 4 | 20 |
| 2 | 15 | 0 | 10 | 13 | 29 |
| 3 | 9 | 10 | 0 | 5 | 12 |
| 4 | 13 | 5 | (7) | 7 | 31 |
| 5 | 20 | 29 | 12 | 31 | 0 |

Underlined value: median of values circled with dotted line
◯: Minimum value of medians
⇒ In this case, delete feature value of index 4

F I G. 10 A
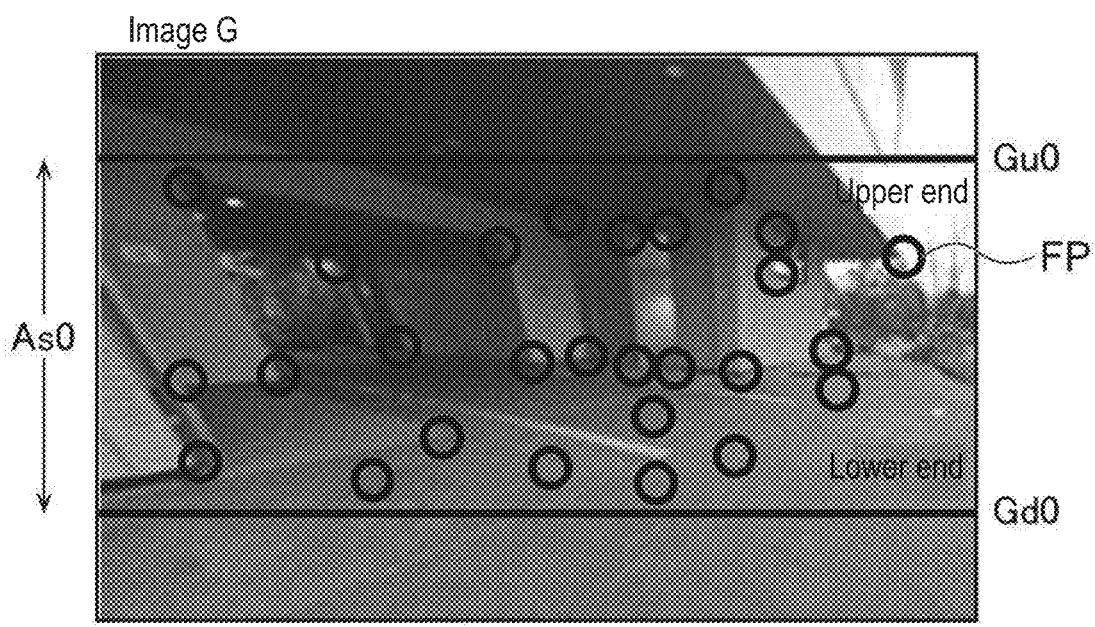
F I G. 10 B
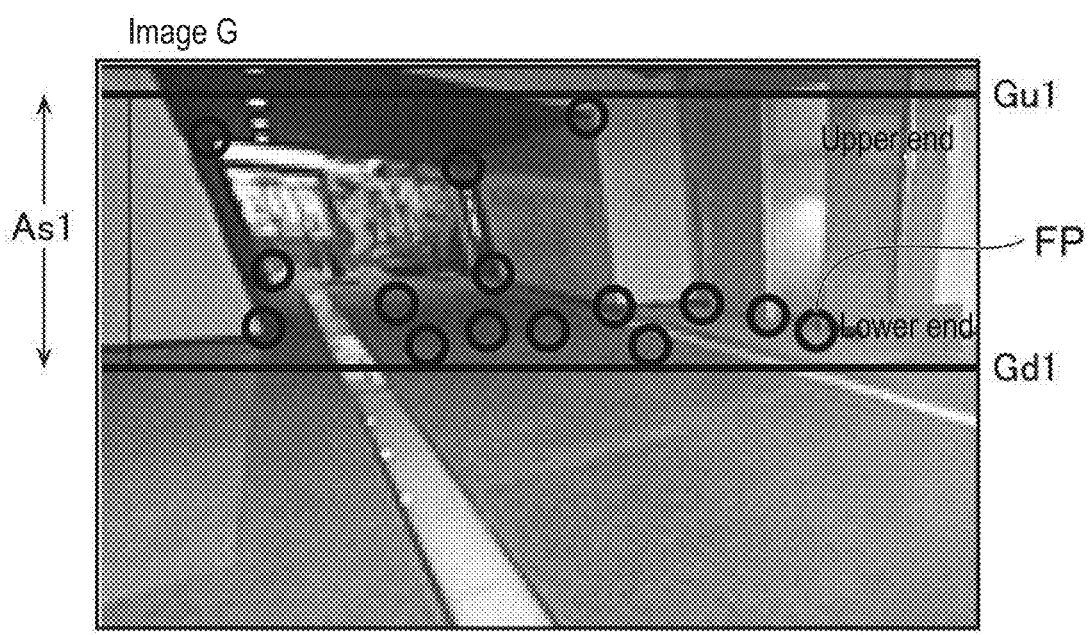

FIG. 14

| | 1 | 2 | 3 | ... | 256 |
|---|---|---|---|---|---|
| Feature value correction factor A | 0 | 0 | 0 | | 0 |
| Feature value correction factor B | +1 | +1 | +1 | | -1 |
| Feature value correction factor B' | -1 | -1 | 0 | | 0 |
| Feature value correction factor C | 0 | +1 | 0 | | 0 |
| Feature value correction factor C' | 0 | -1 | -1 | | +1 |

Direction of sun's rays 31 pixels 31 pixels

1a<1b ···0
2a>2b ···1
3a>3b ···1
⋮
256a>256b ···1

256 bits = 32 bytes

Feature value =011···1

F I G. 22

1a>1b ···1
2a<2b ···0
3a<3b ···0
  ×
  ×
  •
256a>256b ···1

256 bits = 32 bytes

Feature value =100···1

SELF-POSITION ESTIMATION APPARATUS

CROSS REFERENCE TO RELATED APPLICATIONS

This application is based on and claims priority under 35 U.S.C. § 119 to Japanese Patent Application 2018-005012, filed on Jan. 16, 2018, Japanese Patent Application 2018-013946, filed on Jan. 30, 2018, and Japanese Patent Application 2018-023303, filed on Feb. 13, 2018, the entire contents of which are incorporated herein by reference.

TECHNICAL FIELD

This disclosure generally relates to a self-position estimation apparatus, a self-position estimation method, and a self-position estimation program.

BACKGROUND DISCUSSION

According to a known technique, a position of a movable body in three-dimensional space is estimated on a basis of a captured image captured by an image capturing unit such as a camera, for example, mounted at the movable body.

For example, JP2017-138664A which is hereinafter referred to as Reference 1 discloses an automatic driving control apparatus as a technique related to an estimation of a self-position (own position) of a vehicle. The automatic driving control apparatus disclosed in Reference 1 includes an automatic driving information registration unit generating automatic driving information for automatically driving the vehicle based on a registration image serving as an image capturing a surrounding environment of the vehicle in a registration mode where the vehicle is driven by a driver and an automatic driving control unit automatically driving the vehicle based on the automatic driving information and an automatic driving image serving as an image capturing the surrounding environment of the vehicle in an automatic driving mode where the vehicle is driven automatically. The automatic driving information registration unit includes a candidate feature point extraction unit extracting plural candidate feature points which are found in the surrounding environment of the vehicle based on the registration image. The automatic driving information registration unit also includes an automatic driving information generating unit selecting any of the candidate feature points determined to be a structure (building) arranged in a fixed state around a target place of the vehicle, as feature points and generating the automatic driving information serving as information of the position of the selected feature points relative to a predetermined origin coordinate. The automatic driving control unit includes a vehicle position calculation unit calculating vehicle position information serving as information of the position of the vehicle relative to the origin coordinate based on the automatic driving image and the automatic driving information. The automatic driving control unit also includes an automatic driving execution control unit automatically driving the vehicle to the target place based on the vehicle position information. According to the automatic driving control apparatus disclosed in Reference 1, the feature points at the structure are extracted from the image obtained during the vehicle driving in advance, and three-dimensional positions of the respective feature points are estimated and registered at a map. In addition, feature points at the structure are extracted from the image obtained during the automatic driving so as to be compared to the feature point at the structure registered at the map, thus estimating the self-position of the vehicle.

A simultaneous localization and mapping (SLAM) is known to include a mapping mode for generating an environment map and a localization mode for estimating a self-position on the environment map.

An ORB-SLAM is also know to detect feature points such as corners of a structure (circles in FIG. 19) by FAST in an image captured by a camera, for example, and to employ ORB features as description of feature values for the feature points. Such ORB-SLAM is disclosed in "ORB-SLAM: a Versatile and Accurate Monocular SLAM System" IEEE Transactions on Robotics, vol. 31, no. 5, 2015, pp. 1147-1163, by Raul Mur-Artal, J. M. M. Montiel and Juan D. Tardos (which is hereinafter referred to as Reference 2).

Each of the ORB features is described as a feature value in 32 bytes obtained by 256 times of acquisition of magnitude relation of average luminance between two regions of 5-by-5 pixels each (a pair of 1a and 1b in FIG. 19 out of 256 pairs, for example) selected from 31-by-31 pixels with the center of the obtained feature point as illustrated in FIG. 20.

Some feature points extracted from the image may include a greater difference in luminance relative to surroundings. In this case, the feature values of such feature points may change between daytime and night-time caused by change of brightness in the surroundings. Because of such change of each feature value, correlation of the feature point extracted from the image to the feature point which is registered at the map may be unsuccessful, which may inhibit accurate estimation of the self-position of the vehicle. According to Reference 1, because the change of brightness in the surroundings is not considered, the estimation of the self-position of the vehicle may be difficult.

A need thus exists for a self-position estimation apparatus which is not susceptible to the drawback mentioned above.

SUMMARY

According to an aspect of this disclosure, a self-position estimation apparatus includes an image capturing unit capturing a plurality of driving images in a state where an own vehicle is driven along a predetermined driving route and a plurality of reference images at a plurality of positions along the predetermined driving route, a detection unit detecting feature points on each of the plurality of driving images and feature points on each of the plurality of reference images correlated to each of the reference images, a storage unit storing map information which includes the feature points on each of the plurality of reference images and a position and a posture of the image capturing unit at a time each of the plurality of reference images is captured by the image capturing unit, and an estimation unit selecting a similar image similar to one of the plurality of driving images from the plurality of reference images to correlate the feature points on the one of the plurality of driving images and feature points on the similar image, the estimation unit estimating a position and a posture of the own vehicle on the predetermined driving route based on a correlation result.

According to another aspect of this disclosure, a self-position estimation apparatus estimating a position of an own vehicle with an environment map storing a feature value of each of a plurality of feature points of which positions are known, the self-position estimation apparatus includes a feature point extraction unit extracting a plurality of feature points from an image which captures surroundings of the own vehicle, a feature value calculation unit calculating a feature value of each of the plurality of feature points extracted by the feature point extraction unit, the feature value being based on luminance of each of the plurality of feature points, an illuminant direction estimation unit estimating an illuminant direction relative to an imaging direction at a time the image is captured on a basis of sensor information, a correction factor decision unit deciding a feature value correction factor for correcting the feature value of each of the plurality of feature points extracted by the feature point extraction unit so that the feature value is brought to a state where the feature point thereof extracted by the feature point extraction unit is disposed in an illuminant direction in which the environment map is generated by acquiring the feature value of each of the plurality of feature points, on a basis of the feature value of each of the plurality of feature points extracted by the feature point extraction unit, the estimated illuminant direction, and the illuminant direction obtained beforehand when the feature value of each of the plurality of feature points on the environment map is acquired, a feature value correction unit correcting the feature value of each of the plurality of feature points extracted by the feature point extraction unit based on the feature value of each of the plurality of feature points extracted by the feature point extraction unit and the feature value correction factor for each of the plurality of feature points, and an estimation unit estimating a position of the own vehicle based on the corrected feature value for each of the plurality of feature points extracted by the feature point extraction unit and the feature value of each of the plurality of feature points on the environment map.

According to a further aspect of this disclosure, a self-position estimation apparatus estimating a position of an own vehicle with an environment map storing a feature value of each of a plurality of feature points of which positions are known, the self-position estimation apparatus includes a feature point extraction unit extracting a plurality of feature points from an image which captures surroundings of the own vehicle, a feature value calculation unit calculating a feature value of each of the plurality of feature points extracted by the feature point extraction unit, the feature value being based on luminance of each of the plurality of feature points, an illuminant direction estimation unit estimating an illuminant direction relative to an imaging direction at a time the image is captured on a basis of sensor information, a correction factor decision unit deciding a feature value correction factor for correcting the feature value of each of the plurality of feature points on the environment map so that the feature value is brought to a state where the feature point thereof extracted by the feature point extraction unit is disposed in an illuminant direction in which the environment map is generated by acquiring the feature value of each of the plurality of feature points, on a basis of the feature value of each of the plurality of feature points extracted by the feature point extraction unit, the estimated illuminant direction, and the illuminant direction obtained beforehand when the feature value of each of the plurality of feature points on the environment map is acquired, a feature value correction unit correcting the feature value of each of the plurality of feature points on the environment map based on the feature value of each of the plurality of feature points on the environment map and the feature value correction factor for each of the plurality of feature points, and an estimation unit estimating a position of the own vehicle based on the corrected feature value for each of the plurality of feature points on the environment map and the feature value of each of the plurality of feature points extracted by the feature point extraction unit.

BRIEF DESCRIPTION OF THE DRAWINGS

The foregoing and additional features and characteristics of this disclosure will become more apparent from the following detailed description considered with the reference to the accompanying drawings, wherein:

FIG. 5 is a diagram explaining a distance between each of the feature points of the driving image and each of the feature points of the similar keyframe according to the first embodiment;

FIG. 7 is a diagram explaining a feature value which is deleted in a case where the number of plural feature values for each of the feature points of the similar keyframe reaches an upper limit according to the first embodiment;

FIG. 10A is a diagram illustrating an initial feature point detection range according to the second embodiment;

FIG. 10B is a diagram illustrating a feature point detection range in a case where a road surface gradient difference is greater than zero;

FIG. 14 is a diagram illustrating an example of a feature value correction factor according to the third embodiment;

FIG. 22 is a conceptual diagram of an example of the feature value in a case where the direction of sun's rays is changed according to the known technique.

DETAILED DESCRIPTION

Embodiments are explained with reference to the attached drawings. In the following explanation, a vehicle serves as an example of a movable body. A surrounding environment of the vehicle in a case where the vehicle estimates a self-position is defined as a parking space. A route from an outside of the parking space to a parking point is defined as a driving route as an example.

A self-position estimation apparatus, a self-position estimation method, and a self-position estimation program according to a first embodiment are explained with reference to FIGS. 1 to 8.

Figure 1A:
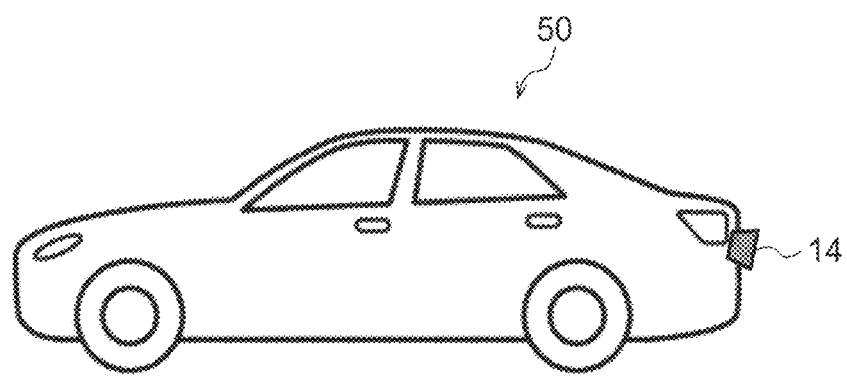
FIG. 1A is a diagram illustrating a vehicle at which a camera is mounted according to first and second embodiments disclosed here.

FIG. 1A is a side view of a vehicle 50 serving as an own vehicle at which a camera 14 is mounted. As illustrated in FIG. 1A, the vehicle 50 includes the camera 14 serving as an image capturing unit used during a process for estimating the self-position of the vehicle 50 (which is hereinafter referred to as a self-position estimation processing) according to the first embodiment.

The camera 14 according to the first embodiment is provided at a trunk positioned at a rear portion of the vehicle 50, for example, so as to capture an image behind the vehicle 50. The camera 14 is arranged in the vicinity of a substantially center portion in a vehicle width direction, for example, in a state where an optical axis of the camera 14 faces slightly downward relative to a horizontal direction. In the first embodiment, the camera 14 is provided at a rear portion of the vehicle 50. Alternatively, the camera 14 may be provided at a front portion of the vehicle 50 depending on environments or circumstances, for example. In addition, in the first embodiment, a monocular camera is used as the camera 14. Alternatively, other types of cameras such as a stereo camera, for example, may be used as the camera 14.

Figure 1B:
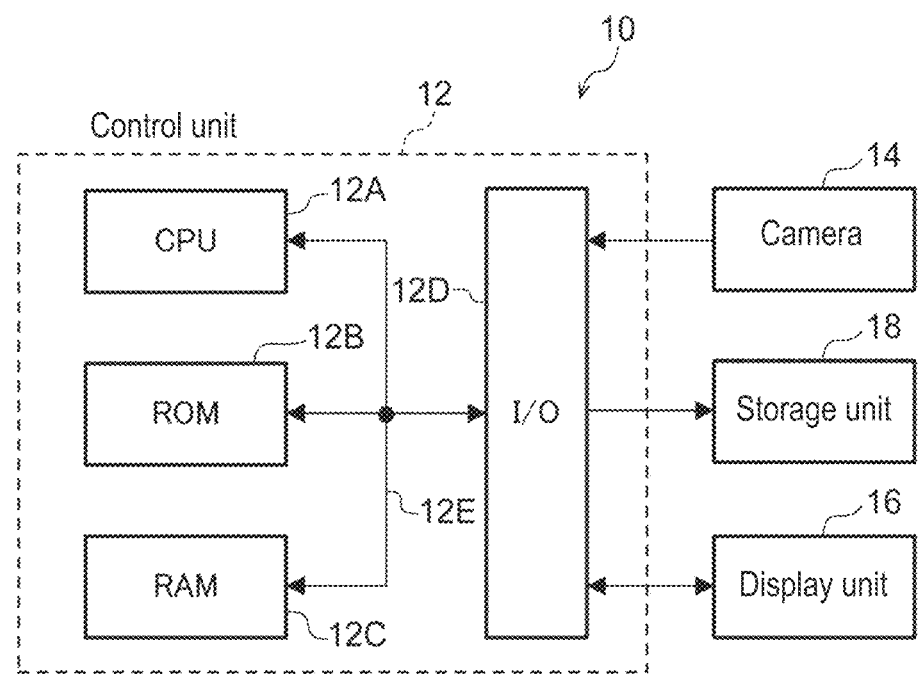
FIG. 1B is a block diagram illustrating an example of a construction of a self-position estimation apparatus according to the first and second embodiments.

FIG. 1B is a block diagram illustrating an example of an electric configuration of a self-position estimation apparatus 10 according to the first embodiment. As illustrated in FIG. 1B, the self-position estimation apparatus 10 is mounted at the vehicle 50 and is constructed by including a control unit 12, the camera 14, a storage unit 16, and a display unit 18.

The control unit 12 performs an arithmetic processing, for example, to estimate the self-position (own position) of the vehicle 50. The control unit 12 includes a central processing unit (CPU) 12A, a read only memory (ROM) 12B, a random access memory (RAM) 12C, and an input and output interface 12D (which is hereinafter referred to as an I/O 12D), for example. The CPU 12A, the ROM 12B, the RAM 12C and the I/O 12D are connected to one another via a bus 12E.

The CPU 12A entirely controls the self-position estimation apparatus 10. The ROM 12B stores various programs and date including a map generation program for generating a map used in the first embodiment and a self-position estimation program for estimating the self-position of the vehicle (vehicle 50), for example. The RAM 12C is a memory used as a work area at a time of execution of various programs. Each program stored at the ROM 12B is developed at the RAM 12C so that the CPU 12A executes the program, thereby generating the map and estimates the self-position of the vehicle 50.

The control unit 12 is connected to the camera 14, the storage unit 16 and the display unit 18 via the I/O 12D. An image captured by the camera 14 is taken in the control unit 12 via the I/O 12D.

The storage unit 16 stores map information, for example, used for the self-position estimation processing according to the first embodiment. The storage unit 16 is not limited to have a specific configuration. For example, a hard disk drive (HDD), a solid state drive (SSD), and a flash memory may be used as the storage unit 16. The storage unit 16 may be provided within the control unit 12 or provided externally connectable. In place of the ROM 12B, the storage unit 16 may store the map generation program and/or the self-position estimation program, in addition to the map information generated by control of the control unit 12.

The display unit 18 displays the image captured by the camera 14, for example. The display unit 18 is not limited to have a specific configuration. For example, a liquid crystal monitor, a cathode ray tube (CRT) monitor, or a flat panel display (FPD) monitor may be used as the display unit 18.

Figure 2A:
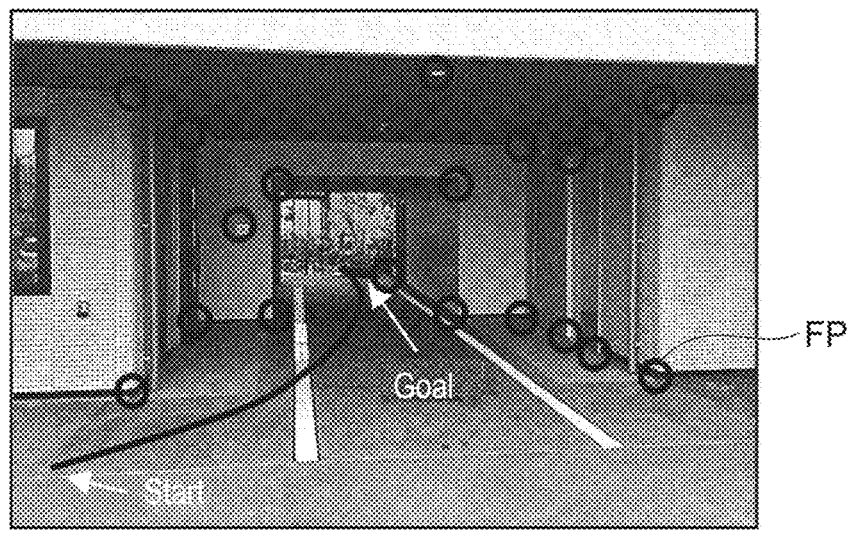
FIG. 2A is a diagram illustrating an example of feature points on a parking route according to the first and second embodiments.

FIG. 2A is a diagram illustrating an example of feature points on a parking route according to the first embodiment. FIG. 2A illustrates a state of a parking space which is assumed in the first embodiment (which is hereinafter referred to as an "environment").

Figure 2B:
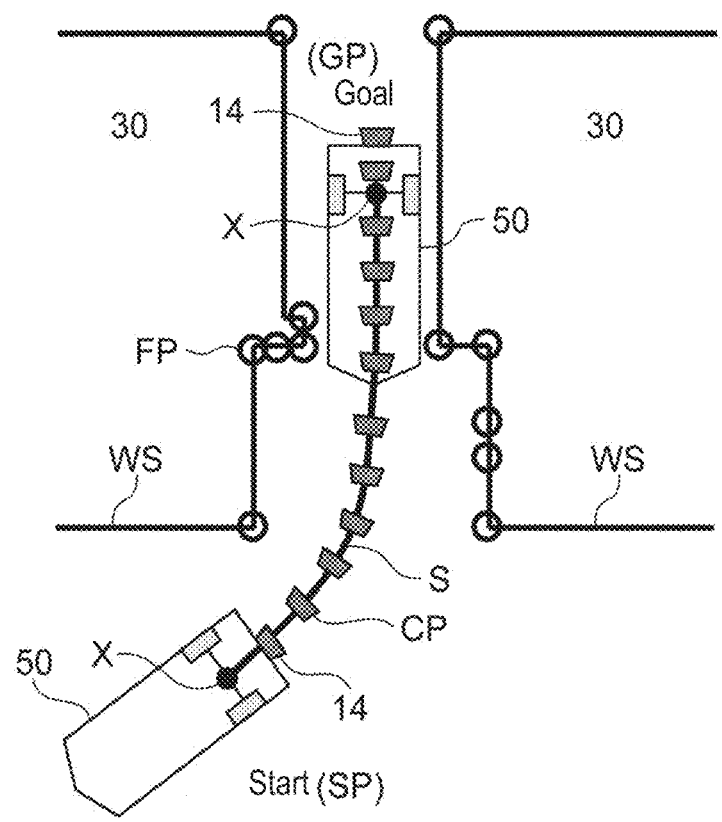
FIG. 2B is a diagram illustrating an example of a position of the camera and positions of feature points in a keyframe according to the first and second embodiments.

In the first embodiment, a route from a "Start" position serving as a starting point to a "Goal" position serving as a parking point as illustrated in FIG. 2A is assumed as the driving route of the vehicle 50. A sign "FP" in FIG. 2A indicates the position of the feature point which is explained later. In order to estimate the self-position of the vehicle 50 with a certain size, a representative position is necessarily decided beforehand within the vehicle 50 (which is hereinafter referred to as a vehicle representative point X). In the first embodiment, the vehicle representative point (representative point) X is positioned at a center between rear wheels in the vehicle width direction as illustrated in FIG. 2B. The vehicle representative point X is not limited to the above position and may be positioned at a gravity center of the vehicle 50, for example.

FIG. 2B, which serves as a plan view of the environment illustrated in FIG. 2A, is a diagram illustrating an example of a camera position and positions of feature points on a keyframe according to the first embodiment.

As illustrated in FIG. 2B, the vehicle 50 including the camera 14 is driven from a start point SP to a goal point GP. In the self-position estimation processing of the first embodiment, the environment is captured and imaged by the camera 14 prior to an actual driving of the vehicle 50 so that associated data correlated to the image captured by the camera 14 (i.e., captured image) is generated beforehand as a map. A sign S in FIG. 2B indicates a driving trajectory of the vehicle 50 at the time of generating the map. In the actual parking, the vehicle 50 is basically driven along the driving trajectory S. In the following, a route along which the vehicle 50 is driven at the time of actual parking (i.e., actual driving) may be referred to as a driving route which is distinguished from the driving trajectory S.

Small circles illustrated in FIG. 2B indicate the positions of the feature points FP. In the first embodiment, each of the feature points has a greater difference in luminance than a predetermined value on the captured image. The difference in luminance is based on shadows caused by a protruding portion and a recessed portion of a building, and design or pattern of a wall surface of the building, for example. Accordingly, as illustrated in FIG. 2B, the feature points are obtained at a wall surface WS of a building 30 in the environment and/or a corner portion of the building 30, for example. The plural feature points FP are basically selected and determined in one map. In the first embodiment, in order to distinguish the plural feature points FP from one another, a "feature value" is correlated (registered) to each of the feature points FP. The feature value according to the first embodiment corresponds to a pattern of difference in luminance in the vicinity of the corresponding feature point, for example.

A sign CP in FIG. 2B indicates plural image capturing points (i.e., twelve image capturing points in FIG. 2B, for example) at which the camera 14 captures respective images at the time of generating the map. In the first embodiment, the images captured at the plural image capturing points CP are referred to as "keyframes" which constitute, together with the feature points FP and information correlated thereto, data for generating the map. Each of the keyframes at this time serves as an example of a reference image. Specifically, the keyframes are the plural images captured beforehand at the plural image capturing points CP. Information related to the feature points is correlated to the respective keyframes. In the following explanation, the image capturing points at which the images are captured at the time of generating the map are referred to as map image capturing points CP, and the image capturing points at which the images are captured at the time of actual parking are referred to as driving image capturing points. In addition, the images captured at the driving image capturing points are referred to as driving images.

Figure 3:
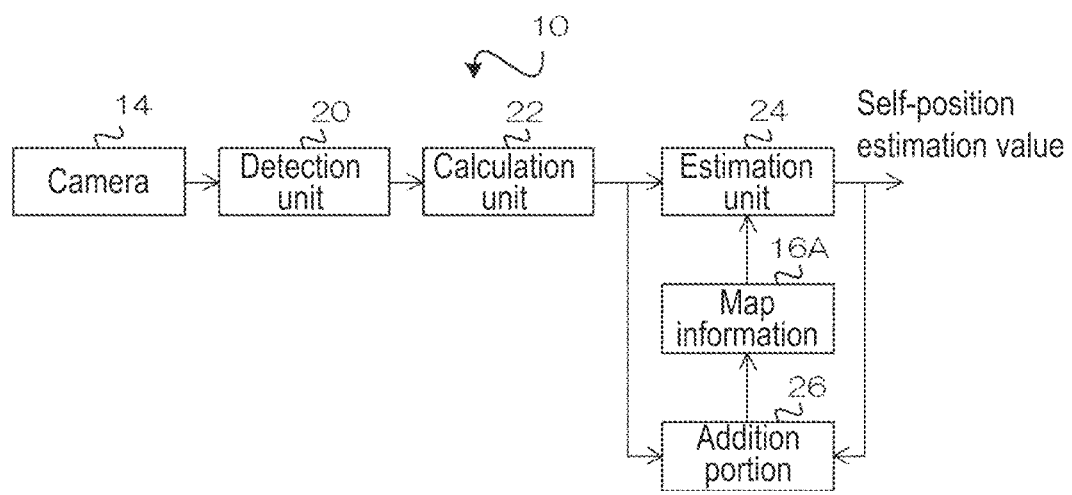
FIG. 3 is a block diagram illustrating an example of a functional configuration of the self-position estimation apparatus according to the first embodiment.

As mentioned above, the CPU 12A according to the first embodiment reads the self-position estimation program stored at the ROM 12B and writes the program for execution at the RAM 12C so as to function as units or portions illustrated in FIG. 3.

FIG. 3 is a block diagram illustrating an example of a functional configuration of the self-position estimation apparatus 10 according to the first embodiment. As illustrated in FIG. 3, the CPU 12A of the self-position estimation apparatus 10 according to the first embodiment functions as a detection unit 20, a calculation unit 22, an estimation unit 24, and an addition unit 26. A map information 16A is stored beforehand at the storage unit 16.

The map information 16A according to the first embodiment is explained below. The map information 16A includes the following information.
(1) Coordinate of each feature point FP displayed in three dimensions (3-dimensional position coordinate (Xp, Yp, Zp))
(2) 3-dimensional position coordinate (Xc, Yc, Zc) and posture (a roll angle, a pitch angle, and a yaw angle) of the camera on each keyframe
(3) Feature value on each keyframe In generation of the map, a driver drives a vehicle along the driving trajectory S beforehand to estimate coordinates of the feature points (3-dimensional positions) and the position of the camera 14 on the keyframe from the captured image captured by the camera 14 during the driving. Such estimation may be performed by visual simultaneous localization and mapping (Visual SLAM), for example. Specifically, 3-dimensional positions of the feature points and the position of the camera on the keyframe are estimated from the captured image by means of the Visual SLAM. The estimation results and feature values of the feature points on the keyframe are then registered at the map information 16A.

More specifically, oriented FAST and rotated BRIEF SLAM (ORB-SLAM) may be employed for detecting the feature points, for example. In the ORB-SLAM, a corner is detected as the feature point, the detection of the corner being achieved by features from accelerated segment test (FAST). The ORB-SLAM employs ORB for description of feature values. The ORB is based on binary robust independent elementary features (BRIEF) and is developed to include scale invariance and rotation invariance. The ORB-SLAM is disclosed in Reference 2, so that detailed explanation thereof is omitted.

As mentioned above, a coordinate of each feature point, at least one feature value registered for each of the feature points, and the position and the posture of the camera 14 when the plural images serving as the keyframes are captured at the map image capturing points CP upon generation of the map are correlated and stored at the storage unit 16 as the map information 16A. The map information 16A stored at the storage unit 16 is referred to in the self-position estimation processing which is explained later.

The detection unit 20 according to the first embodiment detects the feature points on the driving image which is captured by the camera 14 in a state where the vehicle is driven along the driving route. The FAST is utilized for detection of the feature points as mentioned above, for example.

The calculation unit 22 according to the first embodiment calculates the feature value indicating the feature of each of the feature points detected by the detection unit 20. The ORB is utilized as the feature value as mentioned above, for example.

The estimation unit 24 according to the first embodiment selects a similar keyframe serving as an example of a similar image which is similar to the driving image from among the plural keyframes based on the feature values calculated by the calculation unit 22. In a case where the driving image is obtained for the first time (i.e., the initial keyframe is obtained), the similar keyframe which is the most similar keyframe to the driving image is selected by Bag of Visual Words, for example, based on the feature values of the feature points on the driving image. The Bag of Visual Words is a tool for determining a degree of similarity between images by expressing a great number of local features on the image by vector quantization and histograms. It takes a certain time to extract the keyframe by the Bag of Visual Words. Nevertheless, using the Bag of Visual Words which requires a relatively long operation time may not be a problem for the initial driving image which is obtained in a state where the vehicle is stopped at the start point SP. In a case where the driving image is obtained for the second time or later, the keyframe which is the closest to the camera position that is previously estimated is selected to be the similar keyframe.

Next, the estimation unit 24 correlates the feature point on the driving image and the feature point on the similar keyframe by comparing the respective feature values of the aforementioned feature points on the driving image and the similar keyframe.

Figure 4:
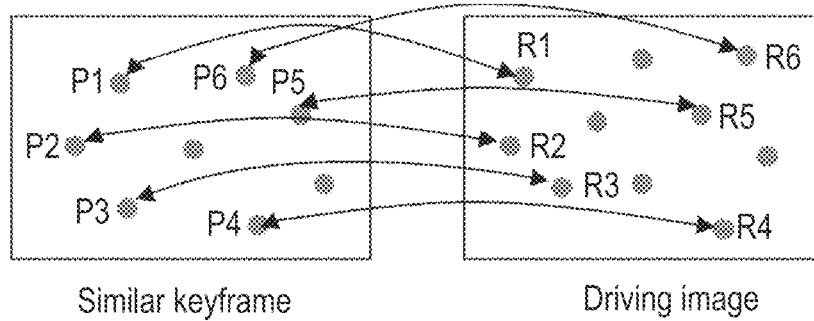
FIG. 4 is a diagram explaining a correlation between feature points of a driving image and feature points of a similar keyframe according to the first embodiment.

FIG. 4 is a diagram explaining a correlation between the feature points on the driving image and the feature points on the similar keyframe.

As illustrated in FIG. 4, feature points R1, R2, R3, R4, R5 and R6 on the driving image are correlated to feature points P1, P2, P3, P4, P5 and P6 on the similar keyframe. Specifically, in a case where ORB is used as each feature value for the feature point, an ORB feature on the driving image and an ORB feature on the similar keyframe are compared so that a distance there between is calculated. The distance between the aforementioned ORB features is calculated by means of a Hamming distance, for example.

FIG. 5 is a diagram explaining a distance between the feature value of the driving image and the feature value of the similar keyframe according to the first embodiment.

In FIG. 5, an ORB feature of one feature point on the driving image and plural ORB features of one feature point on the similar keyframe are each expressed in 8 bits as an example for easy explanation. At this time, the number of bits of the ORB feature is not limited to a specific number such as eight. The plural ORB features of the similar keyframe are assigned with indexes 1, 2 . . . for identification. The Hamming distance here is represented by the number of bits which are different from each other between the ORB feature on the driving image and each of the ORB features (indexes 1, 2 . . . ) on the similar keyframe. In the example of FIG. 5, bits in each of the indexes 1, 2 . . . which are different from the bits of the ORB feature of the feature point on the driving image are underlined. Specifically, the Hamming distance of the index 1 relative to the feature value of the driving image is four and the Hamming distance of the index 2 relative to the feature value of the driving image is two. At this time, the minimum value of the Hamming distance among the aforementioned indexes 1, 2 . . . relative to the feature value of the driving image is employed as the distance between the feature values of the driving image and the similar image.

In a case where the driving image is obtained for the first time, the single feature value is registered for each of the feature points on the similar keyframe. That is, the number of indexes indicating the feature value(s) of each of the feature points is one. In a case where the driving image is obtained for the second time or more, the feature value(s) is additionally registered as illustrated in FIG. 5 by the addition unit 26 which is explained later, so that the number of indexes serving as registered feature values may be two or greater than two. Thus, in the case where the driving image is obtained for the second time or later, the minimum value of the Humming distance calculated between the feature values of the driving image and the similar image is employed as the distance therebetween.

Specifically, the estimation unit 24 calculates respective distances (for example, the Hamming distances) between the plural feature values of the feature point on the similar keyframe and the feature value of the feature point on the driving image for correlating the feature point on the driving image and the feature point on the similar keyframe at which the plural feature values (for example, ORB features) are registered. Then, in a case where the minimum value of calculated distances is equal to or smaller than a predetermined value, the estimation unit 24 correlates the feature point on the driving image and the feature point on the similar keyframe. Consequently, the distance between the aforementioned feature values may easily fall to or below the predetermined value. The correlation of the feature points between the driving image and the keyframe is achievable even in a case where the feature value of the feature point on the driving image changes due to change of brightness in surroundings. At this time, instead of the ORB feature, a vector between the feature points is applicable. In this case, a Euclidean distance may be employed instead of the Hamming distance.

Next, the estimation unit 24 estimates the position and the posture of the own vehicle on the driving route based on the aforementioned correlation result. Specifically, the estimation unit 24 estimates the position and the posture of the camera 14 based on the position of the feature point on the driving image and the position of the feature point on the similar keyframe which are correlated to each other. In the first embodiment, a sum of projection differences which is expressed as differences between respective positions of the feature points on the driving image and respective positions of projection points that are obtained by projecting the feature points on the similar keyframe to the driving image based on the position and the posture of the camera 14 at the time the similar keyframe is captured is minimum at the estimated position and posture of the camera 14.

Figure 6:
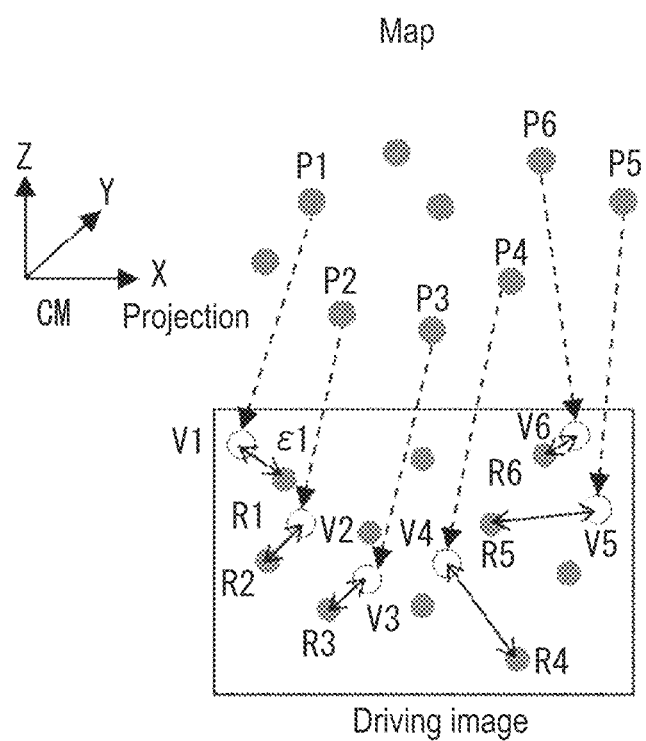
FIG. 6 is a diagram explaining a projection difference according to the first embodiment.

FIG. 6 is a diagram explaining the projection difference according to the first embodiment. FIG. 6 illustrates positions of the feature points R1 to R6 on the driving image, positions of the feature points P1 to P6 on a map coordinate CM correlated to the map (i.e., three-dimensional positions of the feature points P1 to P6), and positions of projection points V1 to V6 obtained by projecting the positions of the feature points P1 to P6 correlated to the map to the driving image. In the map coordinate CM, axes X, Y and Z indicate a horizontal direction, a depth direction, and a vertical direction, respectively. In this case, a projection difference ε1 for the position of the feature point P1 serves as a difference between the position of the feature point R1 and the projection point V1. The aforementioned definition of projection difference is also applied to the positions of the feature points P2 to P6. Because a wrong correlation is minimized, the position and the posture of the camera 14 may be accurately estimated according to the present embodiment.

Next, the estimation unit 24 estimates the position and the posture of the own vehicle (i.e., obtains a self-position estimation value) on the driving route by converting the position and the posture of the camera 14 which are estimated as above to a representative point of the own vehicle. The position of the own vehicle corresponds to the position of the vehicle representative point X on the map. In the first embodiment, because the relative position between the vehicle representative point X and the camera 14 is recognized beforehand, the position and the posture of the camera 14 are converted to the position of the vehicle representative point X based on the aforementioned relative position relationship.

The addition unit 26 according to the first embodiment additionally registers the feature value of the feature point on the driving image correlated to the feature point on the similar keyframe by the estimation unit 24, as the feature value of the feature point on the keyframe serving as the similar keyframe, on the map information 16A. For example, the addition unit 26 may selectively additionally register to the map information 16A, the feature value of the feature point of which projection difference is equal to or smaller than a predetermined value (such feature point may be referred to as an inlier) among the feature points on the driving image correlated to the feature points on the similar keyframe. In the example of FIG. 6, the feature values of the feature points R1, R2, R3 and R6 on the driving image are additionally registered. The feature value of the feature point of which projection difference is large is restrained from being registered.

In a case where the number of plural feature values registered for the feature point on the similar keyframe reaches an upper limit, the addition unit 26 may calculate distances (for example, Hamming distances) between all pairs of the feature values selected from among the registered plural feature values and the feature value to be added. The addition unit 26 may delete one of the feature values, a median of distances of such feature value relative to the other of the feature values being the smallest among medians of the distances between the aforementioned all pairs of the feature values.

FIG. 7 is a diagram explaining the feature value which is deleted in a case where the number of plural feature values registered for each of the feature points on the similar keyframe reaches the upper limit.

In the example of FIG. 7, the upper limit is four so that indexes 1 to 4 are assigned to the registered feature values for one feature point. Another index, i.e., an index 5, is assigned to an additional feature value for the aforementioned feature point. Then, the Hamming distance is calculated between the index 1 and each of the indexes 1 to 5. The calculation result of (0, 15, 9, 13, 20) is obtained as an example. In this case, the median of the Hamming distances is 13 (which is underlined in FIG. 7). In the same manner, the calculation result of (15, 0, 10, 5, 29) is obtained for the index 2 as an example. In this case, the median of the Hamming distances is 10. Further, the calculation result of (9, 10, 0, 7, 12) is obtained for the index 3 as an example. In this case, the median of the Hamming distances is 9. Further, the calculation result of (13, 5, 7, 0, 31) is obtained for the index 4 as an example. In this case, the median of the Hamming distances is 7. Further, the calculation result of (20, 29, 12, 31, 0) is obtained for the index 5 as an example. In this case, the median of the Hamming distances is 20.

Accordingly, the median of the Hamming distances of each of the indexes 1 to 5 is obtained as (13, 10, 9, 7, 20). The minimum value of the medians of the Hamming distances is thus seven, so that the corresponding feature value of the index 4 is deleted.

Figure 8:
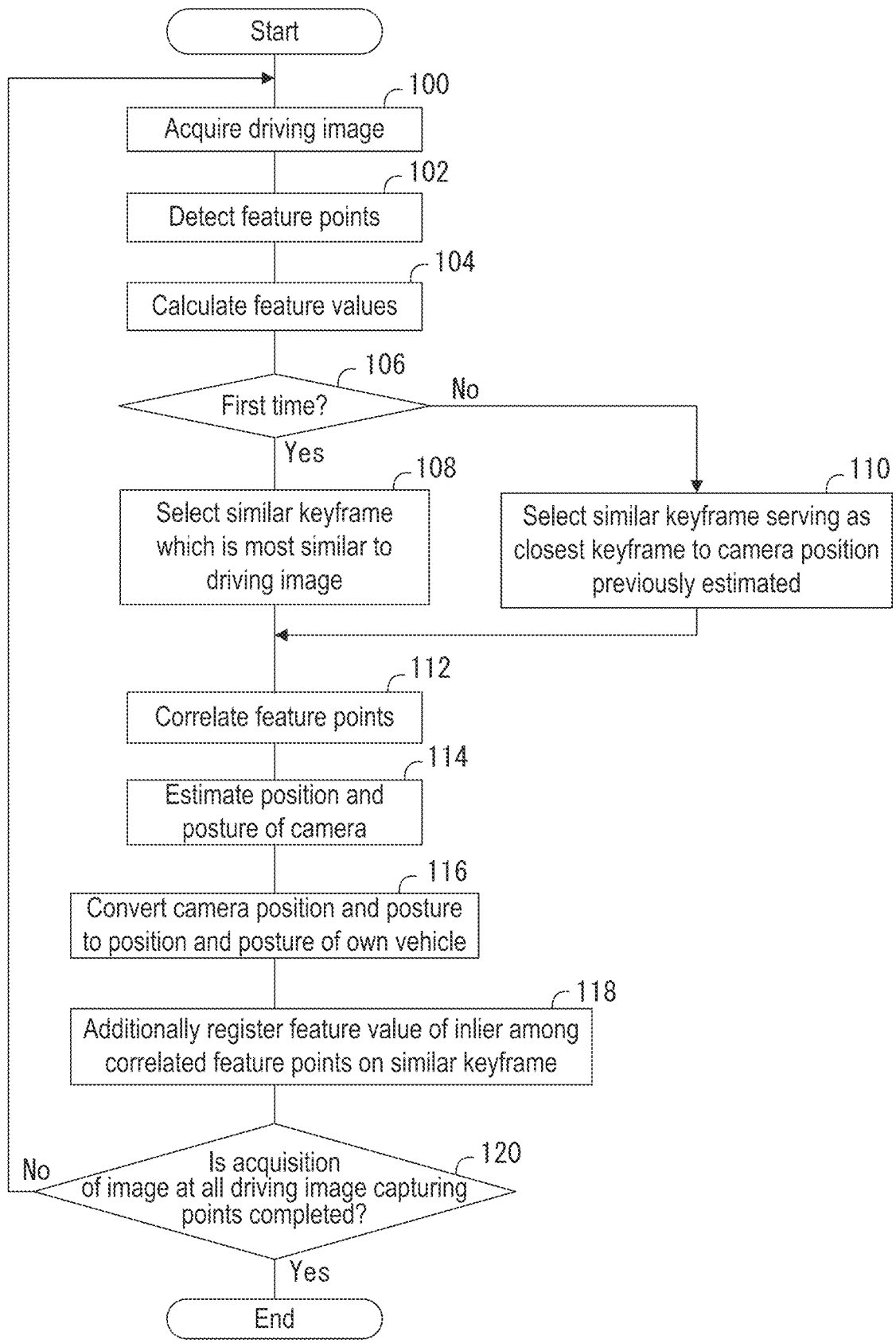
FIG. 8 is a flowchart illustrating an example of a flow of processing by a self-position estimation program according to the first embodiment.

Next, an operation of the self-position estimation apparatus 10 according to the first embodiment is explained with reference to FIG. 8. FIG. 8 is a flowchart illustrating an example of a flow of processing by the self-position estimation program according to the first embodiment.

In a case where an instruction to start the self-position estimation program is made, the self-position estimation processing is performed in conjunction with driving of the vehicle 50 by a driver towards the goal point GP from a state where the vehicle 50 is stopped at the start point SP as illustrated in FIG. 2B. Alternatively, the self-position estimation processing may be applied to an automatic driving of the vehicle 50 from the start point SP to the goal point GP, for example. In the first embodiment, the map information 16A is generated beforehand and is stored at the storage unit 16.

In the first embodiment, the self-position estimation program is stored beforehand at the ROM 12B, for example. Alternatively, the self-position estimation program may be provided in a state being stored at a portable storage medium so as to be readable by a computer or may be delivered via communication means such as network interface, for example. The portable storage medium may include a compact disk read only memory (CD-ROM), a digital versatile disk read only memory (DVD-ROM), and a universal serial bus (USB) memory, for example.

At step 100 in FIG. 8, the detection unit 20 acquires the driving image captured by the camera 14 in a state where the vehicle 50 is being driven. The driving image is acquired per predetermined time period after the vehicle 50 starts from the start point SP. For example, the driving image is obtained per 33 ms (millisecond) serving as a common video rate.

The detection unit 20 detects the feature points from the driving image at step 102. The feature points are detected by the FAST, for example.

At step 104, the calculation unit 22 calculates the feature value indicating feature of each of the feature points detected at the aforementioned step 102. The feature values are calculated on a basis of the ORB, for example.

The estimation unit 24 determines whether or not the driving image is obtained for the first time or not at step 106. According to the self-position estimation processing of the first embodiment, a searching method for searching the similar keyframe is changed at subsequent steps depending on whether the driving image is obtained for the first time or for the second time or later. In a case where is it determined that the driving image is acquired for the first time (i.e., a positive determination is made at step 106), the process proceeds to step 108. In a case where it is determined that the driving image is not acquired for the first time, i.e., the driving image is acquired for the second time or later (i.e., a negative determination is made at step 106), the process proceeds to step 110.

At step 108, the estimation unit 24 selects the keyframe which is the most similar to the driving image as the similar keyframe by means of the Bag of Visual Words, for example, based on the feature values calculated at the aforementioned step 104.

On the other hand, at step 110, the estimation unit 24 selects the similar keyframe serving as the closest keyframe to the camera position previously estimated.

The estimation unit 24 correlates the feature values of the respective feature points between the similar keyframe and the driving image (i.e., pairing) as illustrated in FIGS. 4 and 5 at step 112.

At step 114, the estimation unit 24 estimates the position and the posture of the camera 14 so that the a projection difference is minimized, the projection difference serving as a difference between the position of the feature point on the driving image and a position of a projection point obtained by projecting the feature point on the similar keyframe to the driving image.

The estimation unit 24 converts the position and the posture of the camera 14 estimated at the aforementioned step 114 to the position and the posture of the own vehicle at step 116. The position of the own vehicle at this time corresponds to the position of the vehicle representative point X on the map. In the first embodiment, because the relative position between the vehicle representative point X and the camera 14 is recognized beforehand, the position and the posture of the camera 14 are converted to the position of the vehicle representative point X based on the aforementioned relative position relationship. Because such conversion is obtained by a simple calculation, the position of the own vehicle while the vehicle is being driven is estimated for a short time period, which may decrease a delay time of a vehicle operation control. As a result, the vehicle may be highly accurately guided to a target route and be parked in a narrow space, for example, which may lead to a reduced parking space.

At step 118, the addition unit 26 additionally registers the feature value of the feature point of which projection difference is equal to or smaller than the predetermined value (such feature point is an inlier) on the map information 16A as the feature value of the feature point on the similar keyframe, among the feature points on the driving image correlated to the feature points on the similar keyframe at the aforementioned step 112.

The addition unit 26 determines whether or not acquisition of image at all the driving image capturing points is completed at step 120. In a case where the driving image is captured for the first time, a negative determination is made at step 120, so that the process returns to step 100 to continue acquisition of the driving image. In a case where the driving image is captured for the second time or later, a positive determination is made at step 120, so that the present routine of the self-position estimation program is terminated.

According to the first embodiment, the feature value of the feature point on the driving image correlated to the feature value of the feature point on the similar keyframe (reference image) is registered as the feature value of the similar keyframe in addition to the feature values (or the feature value) previously registered. The feature value of the feature point on the driving image obtained next time is compared to the registered feature values including the previously added feature value. Accordingly, a range of determination that the feature values are similar to each other is enlarged, thus achieving the correlation of the feature points even when the feature value varies due to change of brightness in the surroundings. The self-position of the vehicle may be accurately estimated. In a case where the self-position estimation apparatus according to the first embodiment is applied to an automatic parking system, the vehicle may be highly accurately guided to a target route and be parked in a narrow space, for example, which may lead to a reduced parking space.

The self-position estimation apparatus according to the first embodiment is explained as above. Alternatively, the embodiment may be program that causes a computer to operate and function as each portion included in the aforementioned self-position estimation apparatus. Further alternatively, the embodiment may be a storage medium readable by a computer which stores the aforementioned program.

The construction of the self-position estimation apparatus according to the first embodiment is an example and may be appropriately and adequately changed or modified.

The flow of the program as explained above is an example and may be appropriately changed, i.e., for example, deletion of unnecessary step, addition of new step, or change of process order may be appropriately conducted.

In the aforementioned first embodiment, the program is executed so that the process is realized by software configuration by means of the computer. Alternatively, the process may be realized by a hardware configuration, or a combination of the hardware configuration and the software configuration.

The self-position estimation apparatus 10 according to a second embodiment is explained below. Configurations of the second embodiment which are substantially the same as those of the first embodiment bear the same reference numerals and detailed explanation is omitted. In the second embodiment, the keyframe serves as a reference image. The feature point FP in FIG. 2B correlated to the keyframe serves as an environment feature point in the second embodiment. The feature point FP in FIG. 2B correlated to the driving image serves as a correlation feature point according to the second embodiment.

Setting of a feature point detection range according to the second embodiment is explained with reference to FIGS. 9 and 10. As mentioned above, distribution of the feature points FP on the image (i.e., the keyframe and the driving image) captured by the camera 14 in conjunction with the driving of the vehicle 50 may change depending on factors such as a road surface condition on which the vehicle 50 is driven, for example. In the second embodiment, a gradient (inclination or slope) of a road surface on which the vehicle 50 serving as a target of estimation of its position is assumed as a factor which influences the distribution of the feature points on the entire captured image. Specifically, in a case of high probability that the distribution of the feature points on the entire captured image is biased or uneven due to gradient of the road surface, a detection range of the feature points (correlated feature points) is configured to be changed.

Figure 9A:
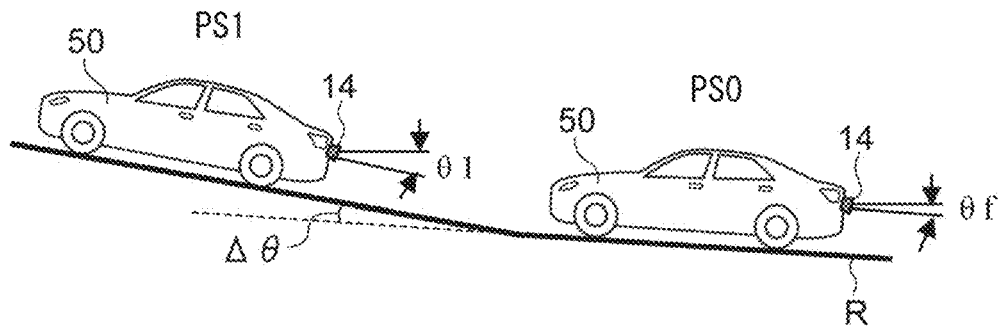
FIG. 9A is a diagram explaining a difference of a camera pitch angle based on a road surface gradient according to the second embodiment.

FIG. 9A illustrates the vehicle 50 which is driven on a road surface R with a gradient. FIG. 9A illustrates an example where the road surface R ahead of the vehicle 50 inclines upward. An example where the road surface R ahead of the vehicle 50 inclines downward has the same concept. In FIG. 9A, a position PS0 indicates a reference position of the vehicle 50 and a position PS1 indicates a position in the middle of climbing of the vehicle 50. The vehicle 50 is located at each of the positions PS0 and PS1. At this time, a pitch angle of the camera 14 of the vehicle 50 located at the position PS0 is defined as θf and a pitch angle of the camera 14 of the vehicle 50 which is located at the position PS1 is defined as θ1. The pitch angle according to the second embodiment, i.e., a pitch angle θ, is an inclination angle of the optical axis of the camera 14 measured relative to a horizontal direction. A direction approaching a ground surface from the horizontal direction is defined as a positive direction. A road surface gradient difference Δθ is defined by (θ1−θf) (i.e., Δθ=θ1−θf). In the aforementioned definition, the road surface gradient difference Δθ is equal to an angle illustrated in FIG. 9A. In the second embodiment, although the optical axis of the camera 14 is arranged facing slightly downward as mentioned above, an explanation below is made in a state where the direction of the optical axis of the camera 14 faces horizontally on the road surface R which is flat and not inclined, for the purposes of easy understanding.

Figure 9B:
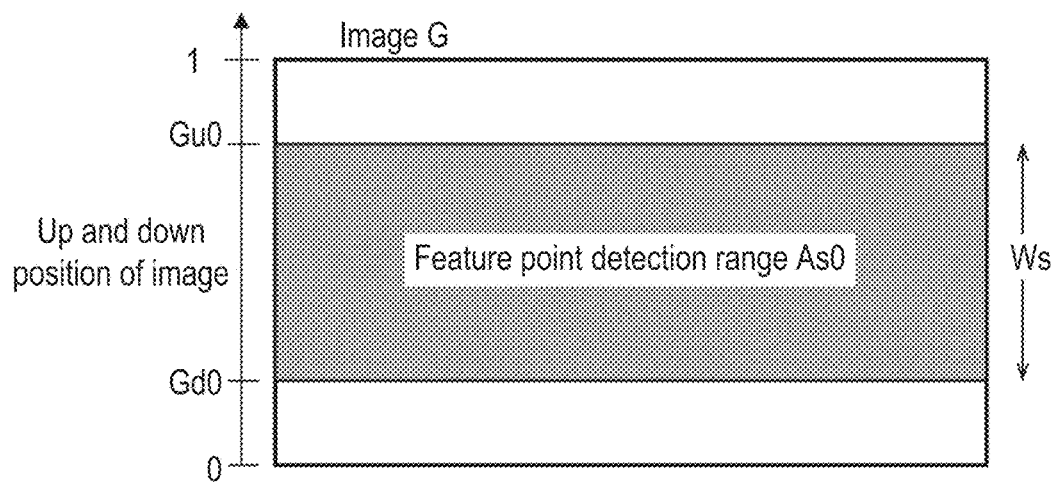
FIG. 9B is a diagram explaining a feature point detection range according to the second embodiment.

FIG. 9B schematically illustrates a feature point detection range As (As0) serving as a detection range in an image G which is captured by the camera 14. The feature point detection range As according to the second embodiment corresponds to an area specified as a search range of the feature points FP on the image G. Specifically, detection of the feature points FP is not conducted on the entire image G and is conducted in a specified and limited area thereof. As illustrated in FIG. 9B, the feature point detection range As is specified by an upper end Gu (Gu0) and a lower end Gd (Gd0) which are specified at upper and lower positions respectively on the image G. The feature point detection range As is not limited to be specified in the aforementioned manner. For example, the feature point detection range As may be specified by an intermediate point Gc between the upper end Gu and the lower end Gd and an image width Ws. FIG. 9B specifically illustrates the feature point detection range As0 in a case where the vehicle 50 is placed at the reference position on a substantially flat (i.e., not inclined) road surface. The feature point detection range As0 is defined by the upper end Gu0 and the lower end Gd0.

Figure 9C:
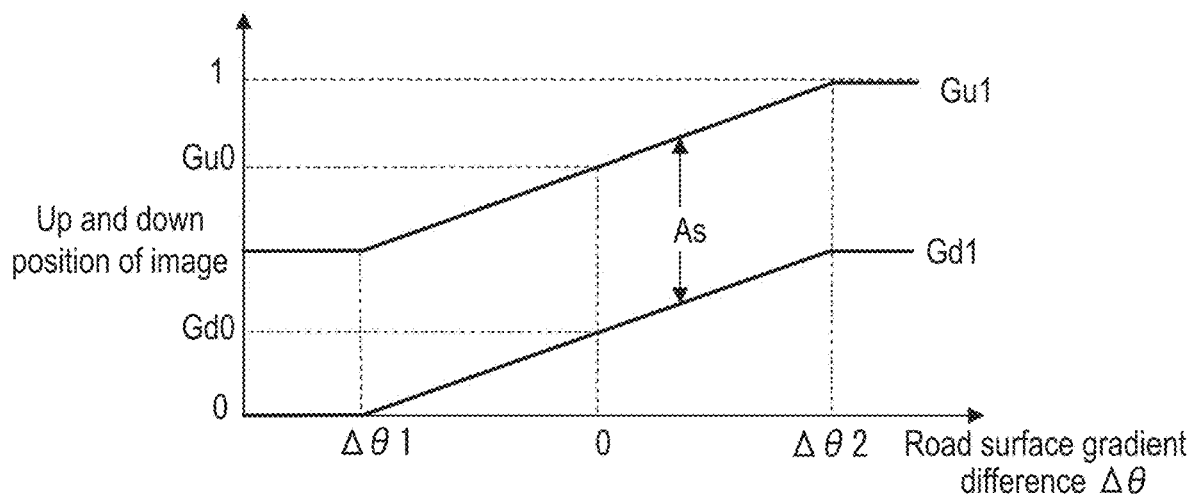
FIG. 9C is a diagram explaining a relationship between an upper end and a lower end of the feature point detection range and the road surface gradient according to the second embodiment.

FIG. 9C illustrates a relationship between the road surface gradient difference Δθ and the feature point detection range As. Specifically, FIG. 9C illustrates the feature point detection range in a state where the road surface gradient difference Δθ falls within a range from Δθ1 to Δθ2 in a case where the road surface ahead of the vehicle inclines upward. A point at which the road surface gradient difference Δθ is zero in FIG. 9C indicates a position where the road surface gradient difference is substantially zero and the road surface R is flat (i.e., not inclined). That is, a positive sign and a negative sign of the road surface gradient difference Δθ are switched at the point of Δθ=0 (i.e., Δθ1<0 and Δθ2>0). The feature point detection range As0 in a case where the road surface gradient difference Δθ is zero is a range between the upper end Gu0 and the lower end Gd0. FIG. 9C illustrates the example where a width of the feature point detection range As is constant within a range of the road surface gradient difference Δθ from Δθ1 to Δθ2. At this time, the width of the feature point detection range As may be changed depending on the road surface gradient difference Δθ.

FIGS. 10A and 10B each illustrate an example of the feature point detection range As in an actual image. FIG. 10A illustrates an example of the feature point detection range (i.e., the feature point detection range As0) in a case where the vehicle 50 is positioned at the road surface R which is flat and of which the road surface gradient difference Δθ is substantially zero. As illustrated in FIG. 10A, in the feature point detection range As0, the upper end Gu0 is defined at a position below the upper end of the image G by a predetermined length while the lower end Gd0 is defined at a position above the lower end of the image G by a predetermined length. That is, in the feature point detection range As0, the detection of the feature point FP is not conducted within a predetermined range at an upper end of the image G and a predetermined range at a lower end of the image G.

FIG. 10B illustrates an example of the feature point detection range (i.e., a feature point detection range As1) in a case where the vehicle 50 is positioned at the road surface R with the road surface gradient difference Δθ being greater than zero (Δθ>0). As illustrated in FIG. 10B, in the feature point detection range As1, an upper end Gu1 is defined at a position substantially equal to the upper end of the image G while a lower end Gd1 is defined at a position in the vicinity of a center in an up and down direction of the image G. That is, in the feature point detection range As1, the detection of the feature point FP is not conducted within a range from the upper end of the image G to the upper end Gu1 and a range from the lower end Gd1 to the lower end of the image G. In explanation of a relationship between the feature point detection range As0 and the feature point detection range As1 with reference to FIG. 9A, it may be considered that the feature point detection range in a case where the vehicle 50 is located at the position PS0 is the feature point detection range As0 and the feature point detection range in a case where the vehicle 50 is located at the position PS1 is the feature point detection range As1.

Figure 11:
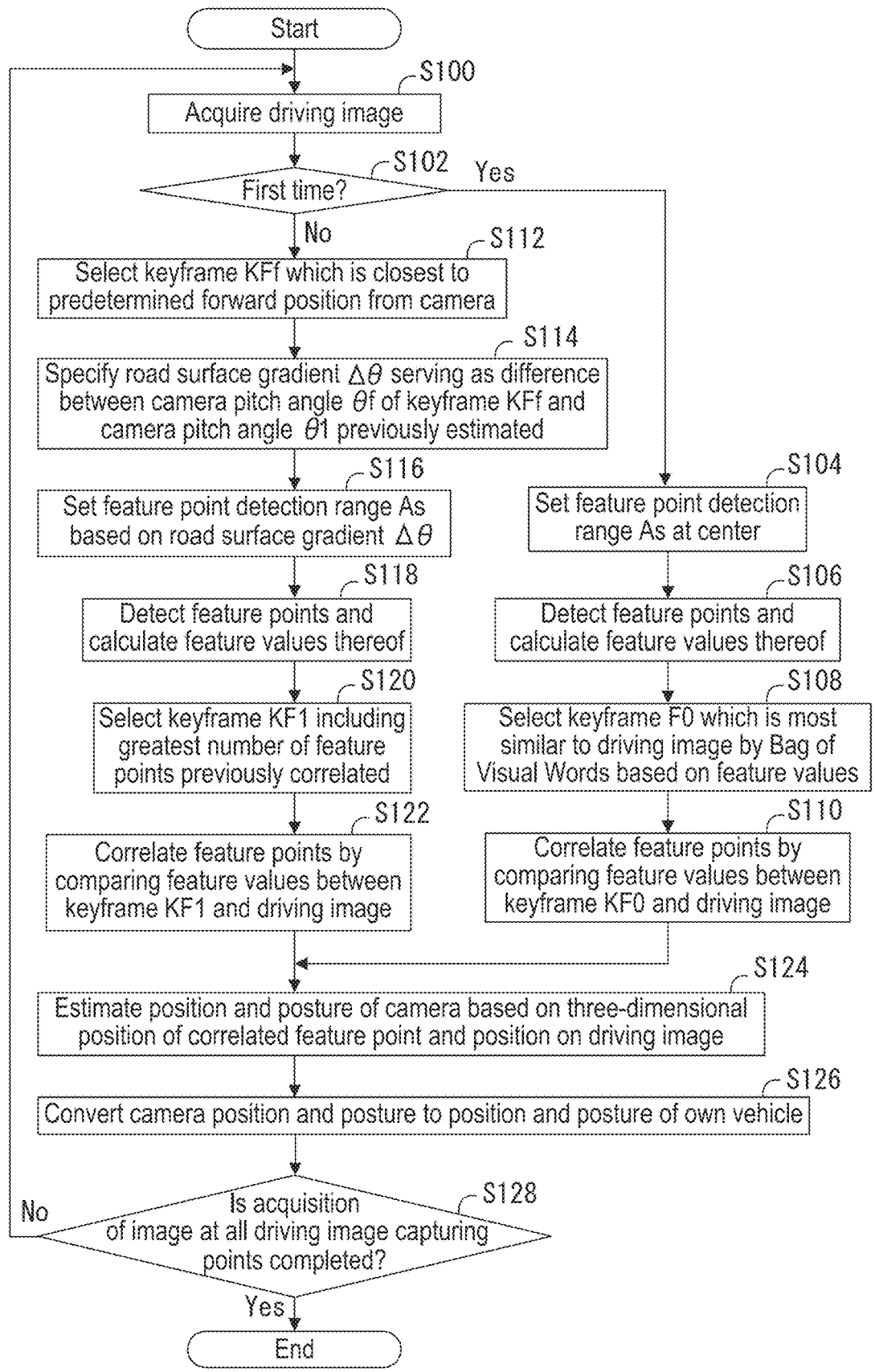
FIG. 11 is a flowchart illustrating a flow of processing by a self-position estimation program according to the second embodiment.

Next, a self-position estimation method according to the second embodiment is explained with reference to FIG. 11. FIG. 11 is a flowchart indicating a flow of the self-position estimation program for estimating the self-position of the vehicle 50. According to the self-position estimation program as illustrated in FIG. 11, when an instruction to start the program is made, the CPU 12A of the control unit 12 serving as a setting unit reads the self-position estimation program from the storage means such as the ROM 12B, for example, and develops the program in the storage means such as the RAM 12C, for example, so as to execute the program. In the second embodiment, a map is generated beforehand and is stored at the storage unit 16. The self-position estimation processing is performed in conjunction with driving of the vehicle 50 by a driver towards the goal point GP from a state where the vehicle 50 is stopped at the start point SP as illustrated in FIG. 2B. Alternatively, the self-position estimation processing may be applied to an automatic driving of the vehicle 50 from the start point SP to the goal point GP, for example.

In the second embodiment, the self-position estimation program is stored beforehand at the ROM 12B, for example. Alternatively, the self-position estimation program may be provided in a state being stored at a portable storage medium so as to be readable by a computer or may be delivered via communication means such as network interface, for example.

The driving image is obtained by being captured by the camera 14 at step S100. The driving image is obtained per predetermined time period after the vehicle 50 starts from the start point SP. For example, the driving image is obtained per 33 ms (millisecond) serving as a common video rate.

It is determined whether or not the driving image is obtained for the first time at step S102. According to the self-position estimation processing of the second embodiment, a feature point detection range setting method and a keyframe searching method are changed at subsequent steps depending on whether the driving image is obtained for the first time or for the second time or later. In a case where a positive determination is made at step S102, the process proceeds to step S104 while the process proceeds to step S112 in a case where a negative determination is made.

The feature point detection range As is set to an initial feature point detection range which is specified beforehand at step S104 because the road surface gradient difference Δθ is not yet estimated at a time the driving image is acquired for the first time. The initial feature point detection range may be specified in any method. For example, the feature point detection range As0 arranged at a center in the up and down direction on the image G as illustrated in FIG. 9C is defined as the initial feature point detection range. As mentioned above, the feature point detection range As0 is a limited area within the image G. Because the initial feature point detection range is the limited area as above, the feature points on the road surface, for example, which are difficult to be distinguished from one another are restrained from being detected. The feature points on a building, for example, which may be easily distinguishable from one another are more detectable.

The feature points are detected and feature values thereof are calculated at step S106. The feature points may be detected by the FAST and the feature values may be calculated on a basis of the ORB as mentioned above.

A keyframe KF0 which is the most similar keyframe to the driving image is selected by Bag of Visual Words, for example, based on the feature values calculated at step S106. The Bag of Visual Words is a tool for determining a degree of similarity between images by expressing a great number of local features on the image by vector quantization and histograms. It takes a certain time to extract the keyframe by the Bag of Visual Words. Nevertheless, because such operation is performed to obtain the initial driving image when the vehicle is stopped at the start point SP, it may not be a problem in using the Bag of Visual Words which requires a relatively long operation time.

The feature values are compared between the keyframe KF0 and the driving image at step S110 so as to correlate the feature points (i.e., pairing) between the keyframe KF0 and the driving image. Because the feature points detected in the feature point detection range As0 are easily distinguishable from one another, accurate correlation is achievable.

Figure 12:
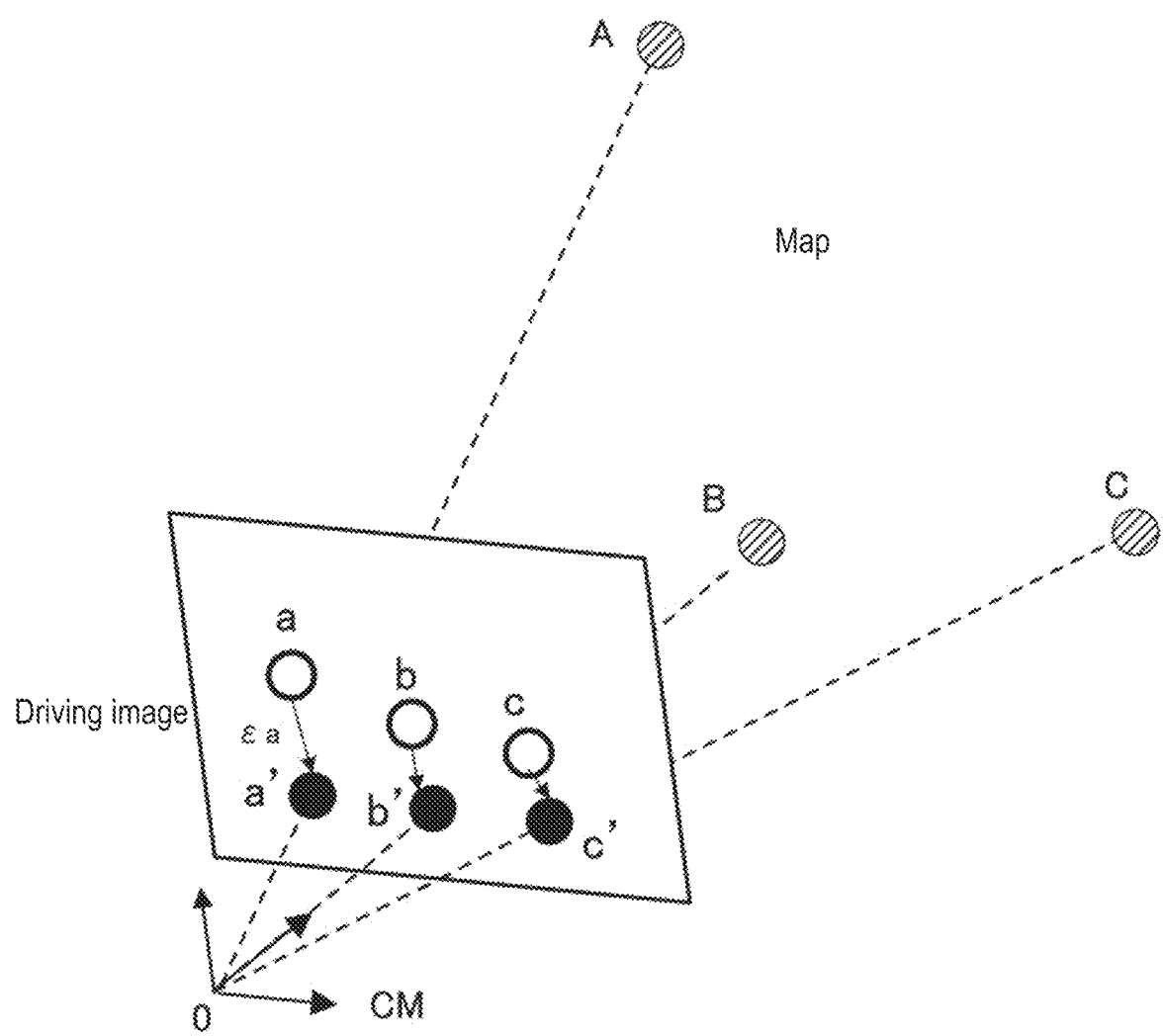
FIG. 12 is a diagram explaining a projection difference according to the second embodiment.

The position and the posture of the camera are estimated so that a projection difference is minimized at step S124, the projection difference being defined between a three-dimensional position (i.e., a position on the map) of the feature point obtained on a basis of correlation between the driving image and the keyframe KF0, and the position of the feature point on the driving image. The projection difference according to the present embodiment is explained with reference to FIG. 12. FIG. 12 illustrates positions a, b, and c of the feature points on the driving image, positions A, B, and C of the feature points on a map coordinate CM correlated onto the map, and positions a', b', and c' of the feature points obtained by projecting the positions A, B, and C of the feature points on the map coordinate CM to the driving image. At this time, a projection difference εa for the position A is a difference between the position a and the position a'. The same is applied to the positions B and C. Because a difference between the position of the feature point on the driving image and the position of the feature point on the map coordinate is small according to the present embodiment, the position and the posture of the camera are accurately estimated.

The position and the posture of the camera estimated at step S124 is converted to the position and the posture of the own vehicle at step S126. The position of the own vehicle (i.e., self-position) corresponds to the position of the vehicle representative point X on the map. In the second embodiment, because a relative position between the vehicle representative point X and the camera 14 is recognized beforehand, the position and the posture of the camera 14 are converted to the position of the vehicle representative point X based on the aforementioned relative position relationship. Because such conversion is obtained by a simple calculation, the position of the own vehicle while the vehicle is driving is estimated for a short time period, which may decrease a delay time of a vehicle operation control. As a result, the vehicle may be highly accurately guided to a target route and be parked in a narrow space, for example, which may lead to a reduced parking space.

It is determined whether or not images (driving images) are obtained at all driving image capturing points at step S128. In a case where the driving image is obtained for the first time, a negative determination is made at step S128 and therefore the process returns to step S100 to continue obtaining the driving image.

On the other hand, at step S112, a keyframe KFf which is the closest keyframe to a forward position by a predetermined distance, i.e., five meters, for example, from the position of the camera 14 which is previously estimated is searched and selected. Specifically, because a distance to the road surface R which appears at a center of the image is obtained beforehand on a basis of an installation angle of the camera 14, a keyframe which is closest to that position is selected.

A difference (θ1−θf) between the camera pitch angle θf of the keyframe KFf and the camera pitch angle θ1 previously estimated is defined as the road surface gradient difference Δθf at step S114.

At step S116, the feature point detection range As is set using a diagram illustrated in FIG. 9C based on the road surface gradient difference Δθf specified at step S114. Specifically, the upper end Gu and the lower end Gd of the feature point detection range As are specified depending on the magnitude of the road surface gradient difference Δθf. As a result, regardless of the road surface gradient difference Δθ, the feature points on the road surface which are difficult to be distinguished from one another are restrained from being detected and the feature points which are easily distinguishable from one another such as the feature points on a building, for example, may be more detected (see FIG. 10B). In addition, because the number of calculations of the feature points is restrained by the limitation of the feature point detection range As, calculations for acquiring the feature values and correlating the future points may decrease. Therefore, even in a system where a computational resource is limited, the estimation of the position of the own vehicle is achievable for a short time period.

In the same manner as step S106, the detection of the feature points and the calculation of the feature values of the detected feature points are performed at step S118.

At step S120, a keyframe KF1 including the greatest number of feature points which are previously correlated is selected.

The feature values are compared between the keyframe KF1 and the driving image so that the feature points thereof are correlated to one another (pairing). In the second embodiment, regardless of the road surface gradient difference Δθ, a great number of feature points serving as comparison targets which may be easily distinguishable from one another are provided. Thus, accurate correlation is obtainable.

Next, the operations at steps S124 to S128 which are explained in the above are performed. At this time, however, the keyframe KF0 is replaced by the keyframe KF1 at step S124. Afterwards, when a positive determination is made at step S128, the self-position estimation program which is presently performed is terminated.

As mentioned above, according to the self-position estimation apparatus, the self-position estimation method, and the self-position estimation program of the second embodiment, the estimation of the self-position of the vehicle is achievable for a short time period even in a system where a computational resource is limited. In the second embodiment, because the detection range of the feature points on the image is limited, the detection time is reduced. Further, because the number of detected feature points is restrained, calculations for acquiring the feature values and correlating the future points may decrease. Thus, the estimation of the position of the own vehicle is achievable for a short time period even in a system where a computational resource is limited.

In addition, according to the self-position estimation apparatus, the self-position estimation method, and the self-position estimation program of the second embodiment, the self-position of the vehicle may be highly accurately estimated even with changes of the road surface gradient. Because the feature point detection range on the driving image is changed depending on the road surface gradient of the self-position of the vehicle relative to a front direction of the camera, the feature points on a building, for example, which are easily distinguishable from one another are more detected while the feature points on a road surface, for example, which are difficult to be distinguished from one another are less detected. The feature points may be accurately correlated between the keyframe and the driving image. Even with changes of the road surface gradient, the self-position of the vehicle may be accurately estimated with the minimum number of detections of the feature points.

Further, in a case where the self-position estimation apparatus, the self-position estimation method, and the self-position estimation program of the second embodiment are applied to an automatic parking system, the vehicle is highly accurately guided to a target route. The vehicle may be parked in a narrow space, which leads to a reduced parking space. In the second embodiment, the position of the own vehicle while the vehicle is being driven is estimated for a short time period, which may decrease a delay time of a vehicle operation control. Thus, the vehicle may be highly accurately guided to a target route and be parked in a narrow space, for example, which may lead to a reduced parking space.

Figure 13:
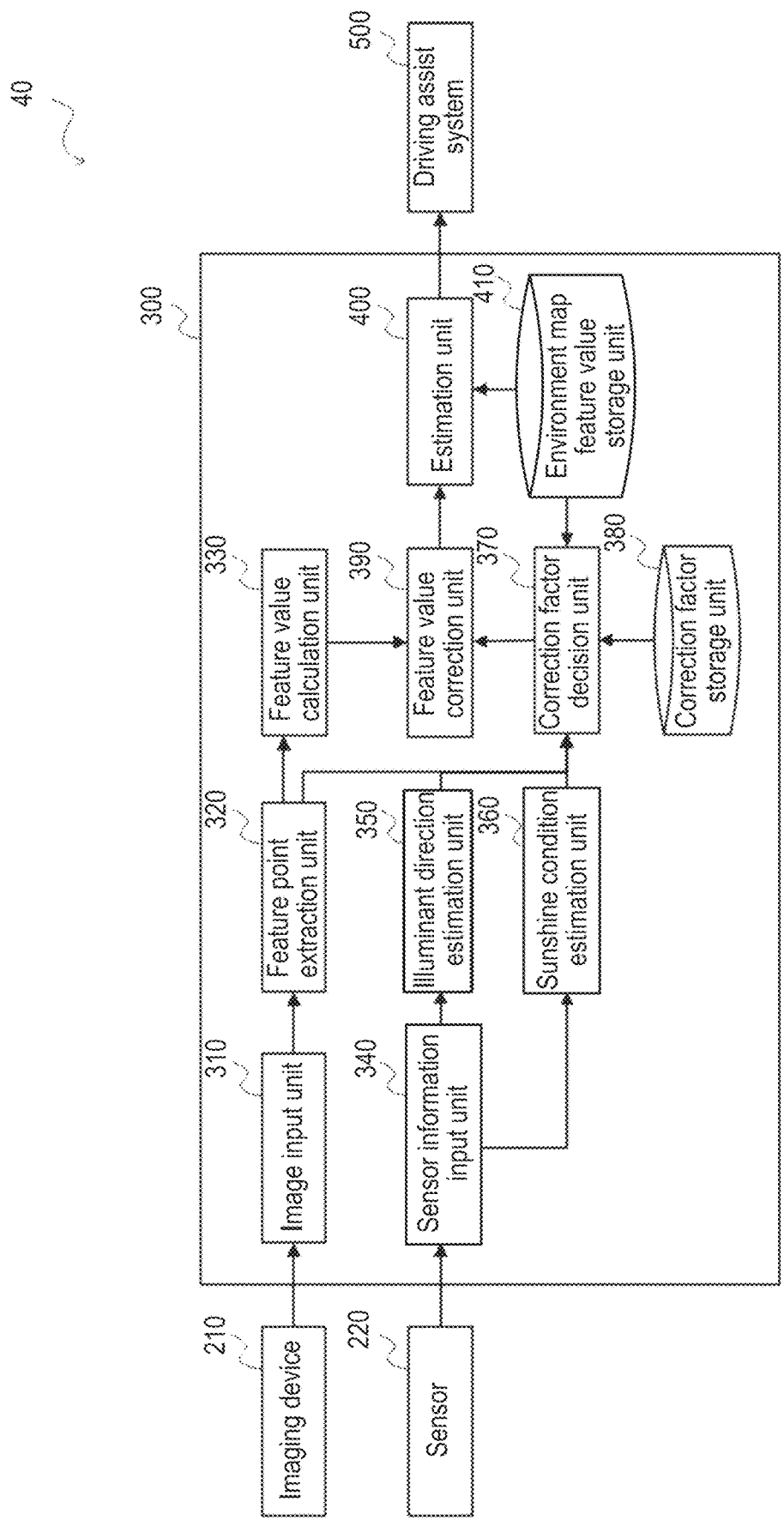
FIG. 13 is a block diagram illustrating a schematic configuration of a self-position estimation apparatus according to a third embodiment disclosed here.

Next, the self-position estimation apparatus according to a third embodiment is explained. As illustrated in FIG. 13, a self-position estimation system 40 according to the third embodiment is constructed by including an imaging device 210 serving as an image capturing unit, a sensor 220, and a self-position estimation apparatus 300.

The imaging device 210 is a camera fixed to a vehicle so as to capture an image in a predetermined direction relative to the vehicle.

Specifically, the imaging device 210 is an onboard monocular camera which images and captures a road ahead of the vehicle, for example. The imaging device 210 captures a road image ahead of the vehicle as an example of a driving road image.

The image captured (i.e., captured image) is not limited to an image ahead of the vehicle and may be an image in the rear of the vehicle or an image at a right or left side of the vehicle.

The sensor 220 is constituted by plural sensors including at least one sensor for acquiring brightness such as an illuminometer, for example, at least one sensor for acquiring time, and at least one sensor for acquiring three-dimensional positioning information or an angle such as a GPS and a magnetic sensor, for example. The aforementioned sensors may be provided at an apparatus other than the self-position estimation apparatus 300, for example. In the third embodiment, the sensor 220 is constituted by the illuminometer and the GPS.

The self-position estimation apparatus 300 estimates the position of the vehicle using an environment map which stores feature values registered for plural feature points of which positions are known. The self-position estimation apparatus 300 includes a CPU, a RAM, and a ROM which stores program for executing a self-position estimation processing routine which is explained later. The self-position estimation apparatus 300 is functionally constructed as follows.

The self-position estimation apparatus 300 includes an image input unit 310, a feature point extraction unit 320, a feature value calculation unit 330, a sensor information input unit 340, an illuminant direction estimation unit 350, a sunshine condition estimation unit 360, a correction factor decision unit 370, a correction factor storage unit 380, a feature value correction unit 390, an estimation unit 400, an environment map feature value storage unit 410, and a driving assist system 500.

The image input unit 310 receives an input of an image from the imaging device 210.

Specifically, the image input unit 310 receives an input of a captured image from the imaging device 210 and sends the aforementioned captured image to the feature point extraction unit 320.

The feature point extraction unit 320 extracts the plural feature points from the image ahead of the vehicle captured by the imaging device 210.

Specifically, the feature point extraction unit 320 extracts the plural feature points from the image using a feature point extraction algorithm (for example, FAST).

The feature point extraction unit 320 sends the extracted feature points to the feature value calculation unit 330 and the correction factor decision unit 370.

The feature value calculation unit 330 calculates the feature values based on luminance of each of the feature points.

Specifically, the feature value calculation unit 330 calculates the feature values for the respective feature points obtained from the feature point extraction unit 320. For example, the feature value calculation unit 330 calculates the feature values each in 32 bytes based on ORB features.

The feature value calculation unit 330 sends the calculated feature values to the feature value correction unit 390.

The sensor information input unit 340 receives, from the sensor 220, brightness obtained by the illuminometer, and three-dimensional positioning information and time thereof obtained by the GPS.

The sensor information input unit 340 sends the three-dimensional positioning information and time thereof to the illuminant direction estimation unit 350 and sends brightness information to the sunshine condition estimation unit 360.

The illuminant direction estimation unit 350 estimates, on a basis of sensor information, an illuminant direction relative to an imaging direction in which the image is captured by the imaging device 210, at a time the image is captured.

Specifically, the illuminant direction estimation unit 350 estimates the illuminant direction (for example, the direction of the sun relative to the north) based on time at which the positioning information is obtained by the GPS (which is hereinafter referred to as GPS positioning time). In the third embodiment, a case where the illuminant is the sun is explained, for example. The illuminant direction estimation unit 350 estimates an angle and an altitude of the sun at the GPS positioning time based on average sunrise time, sunset time, and southing time at the date of the GPS positioning time, for example.

The illuminant direction estimation unit 350 estimates the imaging direction based on the sensor information which is used for calculating the direction of the vehicle. For example, the direction of the vehicle relative to the north is estimated using latitude/longitude acquired by the GPS at the present GPS positioning time and latitude/longitude acquired by the GPS at the previous GPS positioning time. In a case where the vehicle direction and the imaging direction match each other, the estimated vehicle direction is estimated as the imaging direction. In a case where the vehicle direction and the imaging direction do not match each other (i.e., deviate from each other), the imaging direction may be estimated in consideration of such deviation.

The illuminant direction estimation unit 350 estimates the illuminant direction relative to the imaging direction at the time the image is captured on a basis of the estimated illuminant direction and imaging direction. The illuminant direction estimation unit 350 sends the estimation result, i.e., the estimated illuminant direction relative to the imaging direction, to the correction factor decision unit 370.

The sunshine condition estimation unit 360 estimates a sunshine condition of the vehicle based on brightness acquired from the sensor information.

Specifically, the sunshine condition estimation unit 360 estimates an amount of cloud based on the illuminant information by the illuminometer and estimates whether or not shadow is formed. For example, in a case where brightness measured by the illuminometer is equal to or smaller than a predetermined value, it is estimated that it is cloudy and shadow is not formed.

The sunshine condition estimation unit 360 sends the estimation result, i.e., whether shadow is formed or not, to the correction factor decision unit 370.

The correction factor decision unit 370 determines a feature value correction factor for correcting the feature value of each of the plural feature points extracted by the feature point extraction unit 320 so that such feature value is brought to a state where the feature point thereof is disposed in the illuminant direction in which the environment map is generated by acquiring and storing the feature values of the feature points of which positions are known, on a basis of the feature value of the feature point extracted by the feature point extraction unit 320, the estimated illuminant direction relative to the estimated imaging direction, and the illuminant direction relative to the imaging direction which is obtained beforehand at the time the feature value of the environment map is acquired.

Specifically, the correction factor decision unit 370 first acquires the sunshine condition at the time the environment map is generated from the environment map feature value storage unit 410 and determines whether or not the sunshine condition estimated by the sunshine condition estimation unit 360 influences the sunshine condition at the time the environment map is generated.

The influence on the sunshine condition at the time the environment map is generated is determined on a basis of shadows estimated by the sunshine condition estimation unit 360, a difference between the direction of the sun (sun's rays) estimated by the illuminant direction estimation unit 350 and the direction of the sun upon acquisition of the feature values of the environment map, and whether or not the estimated direction of the sun is in front of the vehicle (i.e., whether or not the camera is disposed against the light).

For example, in a case of no shadows in the sunshine condition at the time the environment map is generated, it may be estimated that the amount of cloud is large. Thus, at this time, the correction factor decision unit 370 determines that the sunshine condition estimated by the sunshine condition estimation unit 360 does not influence the sunshine condition at the time the environment map is generated.

In a case where the correction factor decision unit 370 determines that the sunshine condition estimated by the sunshine condition estimation unit 360 influences the sunshine condition at the time the environment map is generated, it is then determined whether or not the direction of the sun relative to the imaging direction at the time the environment map is generated matches the direction of the sun relative to the imaging direction at the time the image (driving image) is captured.

In a case where it is determined that the direction of the sun relative to the imaging direction estimated by the illuminant direction estimation unit 350 matches the direction of the sun relative to the imaging direction at the time the feature value of the environment map is acquired, the correction factor decision unit 370 determines that the sunshine condition estimated by the sunshine condition estimation unit 360 is inhibited from influencing the sunshine condition at the time the environment map is generated.

Even when the direction of the sun relative to the imaging direction estimated by the illuminant direction estimation unit 350 does not match the direction of the sun relative to the imaging direction at the time the feature value of the environment map is acquired, as long as the direction of the sun is ahead of the vehicle, i.e., the light is irradiated from the front side, the camera is positioned against the light and luminance decreases evenly and uniformly. Therefore, the correction factor decision unit 370 determines that the sunshine condition estimated by the sunshine condition estimation unit 360 is inhibited from influencing the sunshine condition at the time the environment map is generated.

On the other hand, in a case of irradiation of sunlight from the rear side, the correction factor decision unit 370 determines whether or not the direction of the sun relative to the imaging direction estimated by the illuminant direction estimation unit 350 is at a right side or a left side relative to the direction of the sun at the time the environment map is generated.

At this time, the correction factor decision unit 370 estimates whether the feature point is a protrusion or a recess (i.e., protruded or recessed). For example, an average luminance at a right side and an average luminance at a left side relative to the feature point may be obtained. Specifically, a range centered at the feature point (for example, ±15 pixels) is divided into a right half and a left half. The average luminance at the right half and the average luminance at the left half are then obtained respectively. In a case where the sun's rays shine on the left side relative to the feature point and the average luminance of the left side is higher, the feature point is estimated to be the protrusion. In a case where the sun's rays shine on the left side relative to the feature point and the average luminance of the right half is higher, the feature point is estimated to be the recess. In addition, in a case where the sun's rays shine on the right side relative to the feature point and the average luminance of the right side is higher, the feature point is estimated to be the protrusion. In a case where the sun's rays shine on the right side relative to the feature point and the average luminance of the left side is higher, the feature point is estimated to be the recess.

Alternatively, as a method for estimating whether the feature point is the protrusion or the recess, a range centered at the feature point (for example, ±16 pixels) may be divided into squares or divided radially with reference to the feature point. The average luminance at the resulting areas may be then calculated and compared.

Accordingly, the correction factor decision unit 370 determines whether the feature point is the protrusion or the recess for all the feature points.

The correction factor decision unit 370 determines the feature value correction factor based on whether the direction of the sun relative to the estimated imaging direction by the illuminant direction estimation unit 350 is at a right side or a left side relative to the direction of the sun at the time the environment map is generated and based on whether the feature point is the protrusion or the recess.

First, in a case where the correction factor decision unit 370 determines that the estimated sunshine condition does not influence the sunshine condition obtained at the time the environment map is generated, the correction of the feature value is not necessary. Thus, the correction factor decision unit 370 determines a feature value correction factor A (see FIG. 14) including sequences which are all zero as the feature value correction factor.

The correction factor decision unit 370 determines a feature value correction factor B (see FIG. 14) as the feature value correction factor in a case where the direction of the sun relative to the imaging direction estimated by the illuminant direction estimation unit 350 is at a right side of the direction of the sun at the time the environment map is generated and the feature point is the protrusion. In addition, in a case where the direction of the sun relative to the imaging direction estimated by the illuminant direction estimation unit 350 is at a right side of the direction of the sun at the time the environment map is generated and the feature point is the recess, the correction factor decision unit 370 determines a feature value correction factor B' (see FIG. 14) as the feature value correction factor.

Further, the correction factor decision unit 370 determines a feature value correction factor C (see FIG. 14) as the feature value correction factor in a case where the direction of the sun relative to the imaging direction estimated by the illuminant direction estimation unit 350 is at a left side of the direction of the sun at the time the environment map is generated and the feature point is the protrusion. In a case where the direction of the sun relative to the imaging direction estimated by the illuminant direction estimation unit 350 is at a left side of the direction of the sun at the time the environment map is generated and the feature point is the recess, the correction factor decision unit 370 determines a feature value correction factor C' (see FIG. 14) as the feature value correction factor.

The correction factor decision unit 370 determines feature value correction factors for all the feature points and sends the determined feature value correction factors to the feature value correction unit 390.

The correction factor storage unit 380 stores various patterns of feature value correction factors which are predetermined for the feature values of the feature points on the map.

The feature value correction factor is separately and individually determined depending on whether or not the estimated sunshine condition influences the sunshine condition at the time the environment map is generated, difference of the direction of the sun relative to the feature point, whether the feature point is a protrusion or a recess, and the direction of the sun relative to the imaging direction in which the image is captured.

Examples of the feature value correction factors are illustrated in FIG. 14. In the example of FIG. 14, each of the feature value correction factors includes a certain length depending on the feature value, i.e., for example, includes 256 sequences each of which is expressed by any one of three values [+1, 0, −1]. The feature value includes a bit stream constituted by 256 bits each of which is expressed by 1 or 0. Thus, the values [+1, 0, −1] of the sequences of the feature value correction factor mean changing each bit in the bit stream of the corresponding feature value to 1, keeping the bit as it is, and changing the bit to 0.

Various kinds and patterns of the feature value correction factors are determined so as to conform to the bits of each of the feature values by considering various cases and situations based on whether or not the estimated sunshine condition influences the sunshine condition at the time the environment map is generated, whether the feature point is a protrusion or a recess, and the direction of the sun relative to the imaging direction in which the image is captured.

In a case where the estimated sunshine condition does not influence the sunshine condition at the time the environment map is generated, the correction of the feature value is not necessary. Thus, the feature value correction factor including all the sequences being zero, i.e., the feature value correction factor A in FIG. 14, is decided.

In a case where the estimated sunshine condition influences the sunshine condition at the time the environment map is generated, i.e., shadow is formed, the feature value correction factor in view of a case where the direction of the sun relative to the imaging direction is at a right side of the direction of the sun at the time the environment map is generated, and the feature point is the protrusion, i.e., the feature value correction factor B in FIG. 14, is decided for the feature value of the feature point on the map.

Two regions (points) (for example, two regions 1a and 1b in FIG. 21) in the feature point on the map are compared to each other by calculation of luminance at the two regions so as to obtain each bit of the feature value of the feature point. Depending on whether or not the two regions are positioned at the same side, i.e., the left side or the right side, relative to the feature point on the map, the value of one of the 256 sequences of the feature value correction factor is determined.

In a case where the two regions are positioned at the same side, no influence is considered on each bit of the feature value even with shadow being formed relative to the feature point. Thus, the value of corresponding sequence of the feature value correction factor is set to zero.

For example, the feature value correction factor is determinable using two regions (xa, xb) of 5-by-5 pixels each, the two regions on which the luminance calculation is performed for comparison so as to obtain the x-th bit of the feature value. In a case where the aforementioned two regions are both positioned at the left side or at the right side of the feature point, the value of the x-th sequence of the feature value correction factor for the aforementioned feature point is set to zero.

In a case where the region xa is positioned at the right side and the region xb is positioned at the left side (for example, regions 1a and 1b in FIG. 21), the regions 1a and 1b on which the luminance calculation is performed, the left side is darker (i.e., includes low luminance) when the direction of the sun relative to the imaging direction at the time the image is captured is at the right side relative to the direction of the sun at the time the environment map is generated and the feature point is the protrusion because the shadow is formed at the left side. That is, the luminance at the region xa is greater than the luminance at the region xb. Thus, the x-th bit of the feature value which is influenced by the sunshine condition is one (1).

At this time, as long as the x-th bit of the feature value of the feature point on the map is one, the correction of the feature value is not necessary. Thus, the value of the x-th sequence of the feature value correction factor is set to zero. On the other hand, in a case where the x-th bit of the feature value of the feature point on the map is zero, the x-th bit of the feature value which is extracted should be corrected to zero so that the value of the x-th sequence of the feature value correction factor is set to minus one (−1).

On the other hand, in a case where the region xa is positioned at the left side and the region xb is positioned at the right side, the luminance at the region xa is smaller than the luminance at the region xb when the direction of the sun relative to the imaging direction at the time the image is captured is at the right side relative to the direction of the sun at the time the environment map is generated and the feature point is the protrusion, so that the x-th bit of the feature value influenced by the sunshine condition is zero.

At this time, as long as the x-th bit of the feature value of the feature point on the map is zero, the correction of the feature value is not necessary. Thus, the value of the x-th sequence of the feature value correction factor is set to zero. On the other hand, in a case where the x-th bit of the feature value of the feature point on the map is one, the x-th bit of the feature value of the extracted feature point should be corrected to one so that the value of the x-th sequence of the feature value correction factor is set to plus one (+1).

The aforementioned operation is performed on all bits so as to determine the feature value correction factor B.

In the same manner, the feature value correction factor B' is determined for a case where the direction of the sun relative to the imaging direction at the time the image is captured is at the right side relative to the direction of the sun at the time the environment map is generated and the feature point is the recess. The feature value correction factor C is determined for a case where the direction of the sun relative to the imaging direction at the time the image is captured is at the left side as compared to the direction of the sun at the time the environment map is generated and the feature point is the protrusion. The feature value correction factor C' is determined for a case where the direction of the sun relative to the imaging direction at the time the image is captured is at the left side as compared to the direction of the sun at the time the environment map is generated and the feature point is the recess.

Accordingly, various patterns of the feature value correction factors are determined so that, even when the estimated sunshine condition influences (for example, because of shadow) the sunshine condition at the time the environment map is generated, the feature value of the extracted feature point is correctable in view of such influence based on the direction of the sun's rays to the two regions (points) which are compared to each other and the shape (protrusion, recess) of the feature point.

The feature value correction unit 390 corrects the feature value of each of the plural feature points based on the feature value and the feature value correction factor which conforms to the pattern of the corresponding feature point (i.e., the shape thereof and the direction of the sun).

Specifically, the feature value correction unit 390 corrects the feature value by adding respective values of the sequences of the feature value correction factor to respective bits of the bit stream of the feature value. At this time, in a case where a resulting bit obtained from the aforementioned addition exceeds +1, such bit of the feature value is corrected to one. In a case where a resulting bit obtained from the aforementioned addition falls below zero, such bit of the feature value is corrected to zero.

Figures 19, 20:
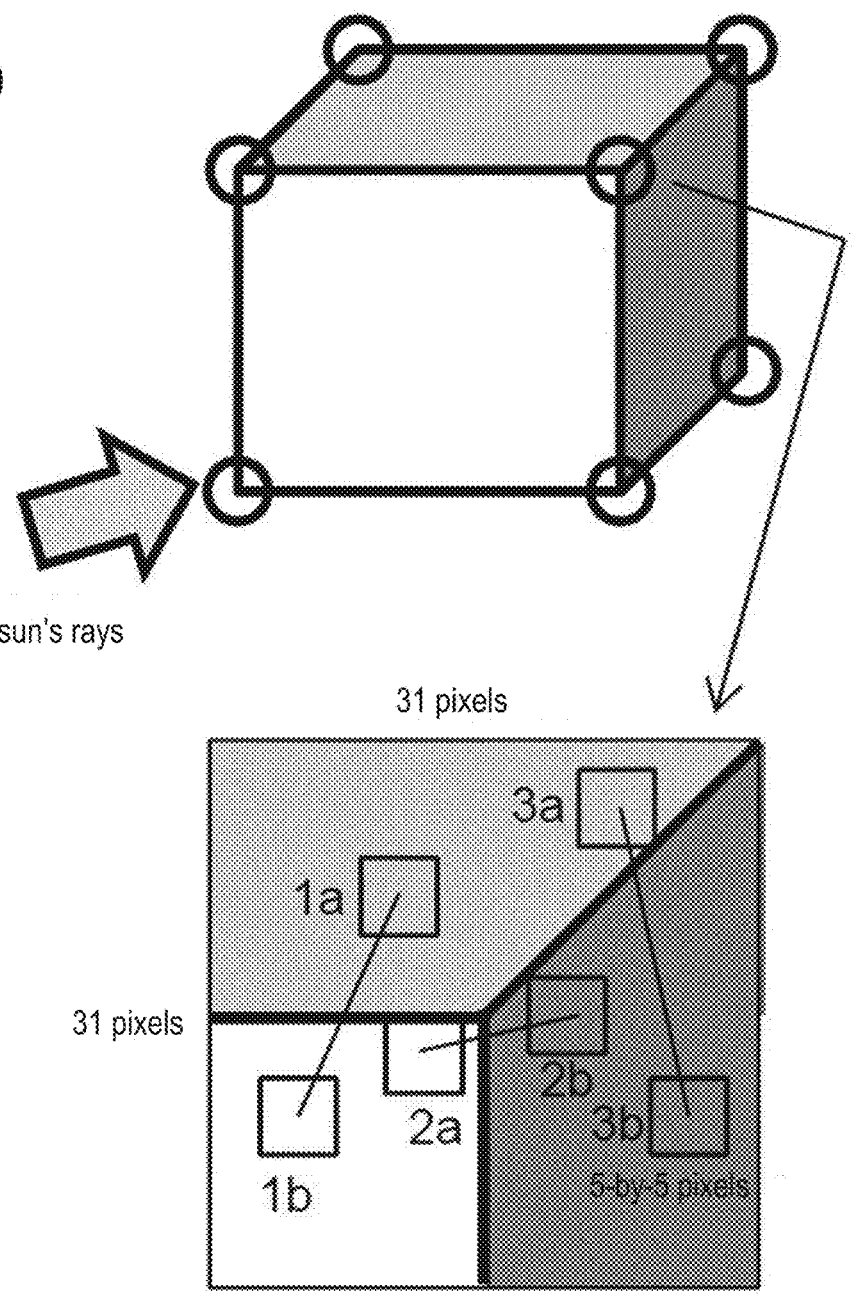
FIG. 19 is a conceptual diagram of an example of a method for detecting a feature point and obtaining a feature value thereof according to a known technique.
FIG. 20 is a conceptual diagram of an example of the feature value according to the known technique.
Figure 21:
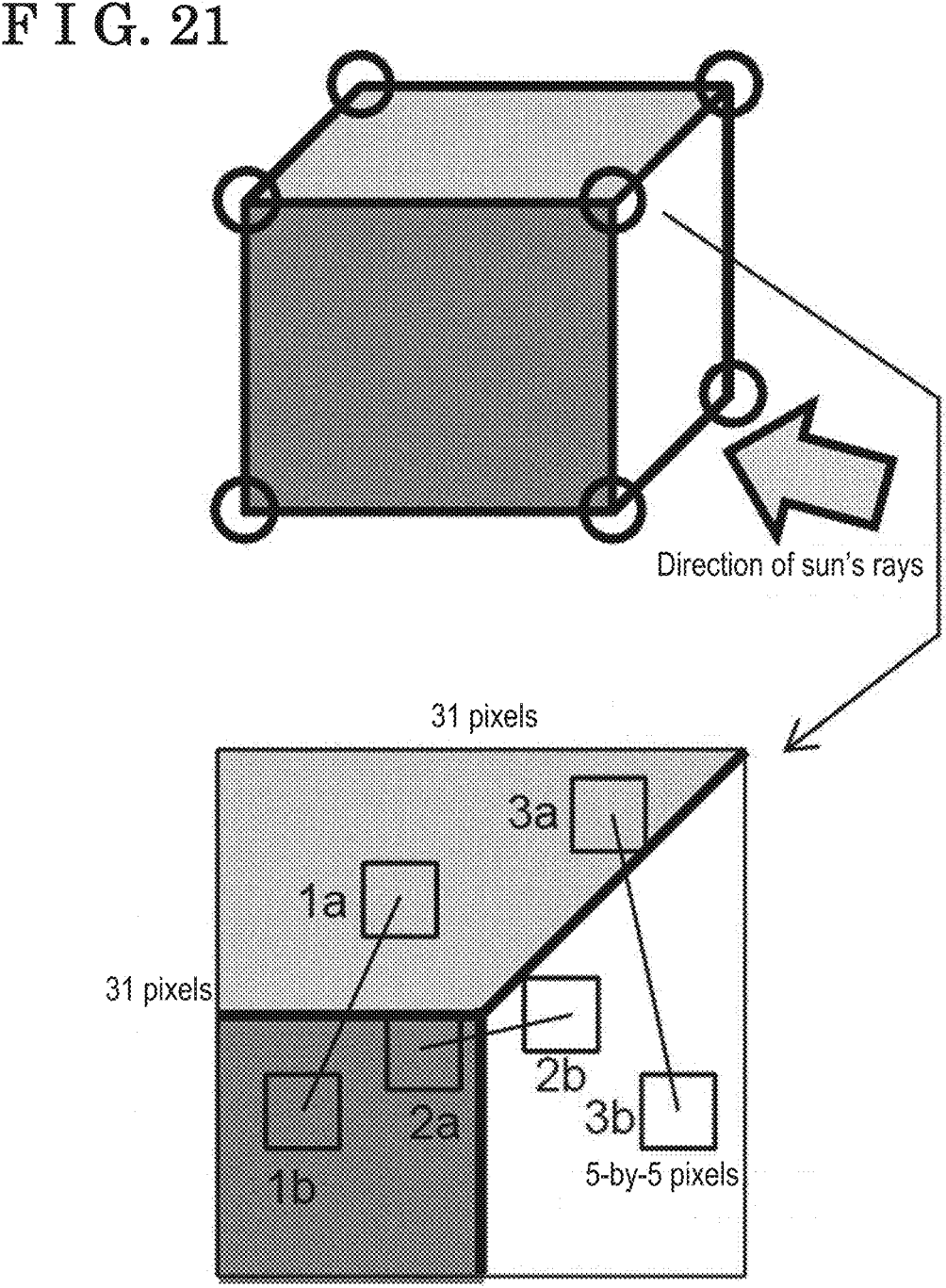
FIG. 21 is a conceptual diagram of an example of a case where a direction of sun's rays is changed according to the known technique.

In a case of FIG. 21, for example, the feature value is represented by "1, 0, 0, . . . , 1" as illustrated in FIG. 22. At this time, in a case where the feature value correction factor is represented by "−1, 1, 1, . . . , 0", a value after correction (corrected feature value) is represented by "0, 1, 1, . . . , 1" which matches the feature value in FIG. 20 which illustrates the case of FIG. 19.

The feature value correction unit 390 sends the corrected feature values for all the feature points to the estimation unit 400.

The estimation unit 400 estimates the position of the vehicle based on the corrected feature values of the plural feature points extracted by the feature point extraction unit 320 and the feature values of the feature points on the map.

Specifically, the estimation unit 400 estimates the position where the vehicle is located on the map by matching the corrected feature values and the feature values of the feature points on the map. For example, the estimation unit 400 determines a position corresponding to or a position with the feature value including the highest similarity between the corrected feature values and the feature values of the plural feature points on the environment map as an estimated vehicle position on the environment map.

The estimation unit 400 then outputs the estimated vehicle position to the driving assist system 500.

The environment map feature value storage unit 410 stores the environment map which is generated beforehand, the feature values on the environment map, and the sunshine condition at the time the environment map is generated. The environment map is generated in a mapping mode of SLAM, for example.

The driving assist system 500 performs driving assist based on the estimated vehicle position.

Figure 15:
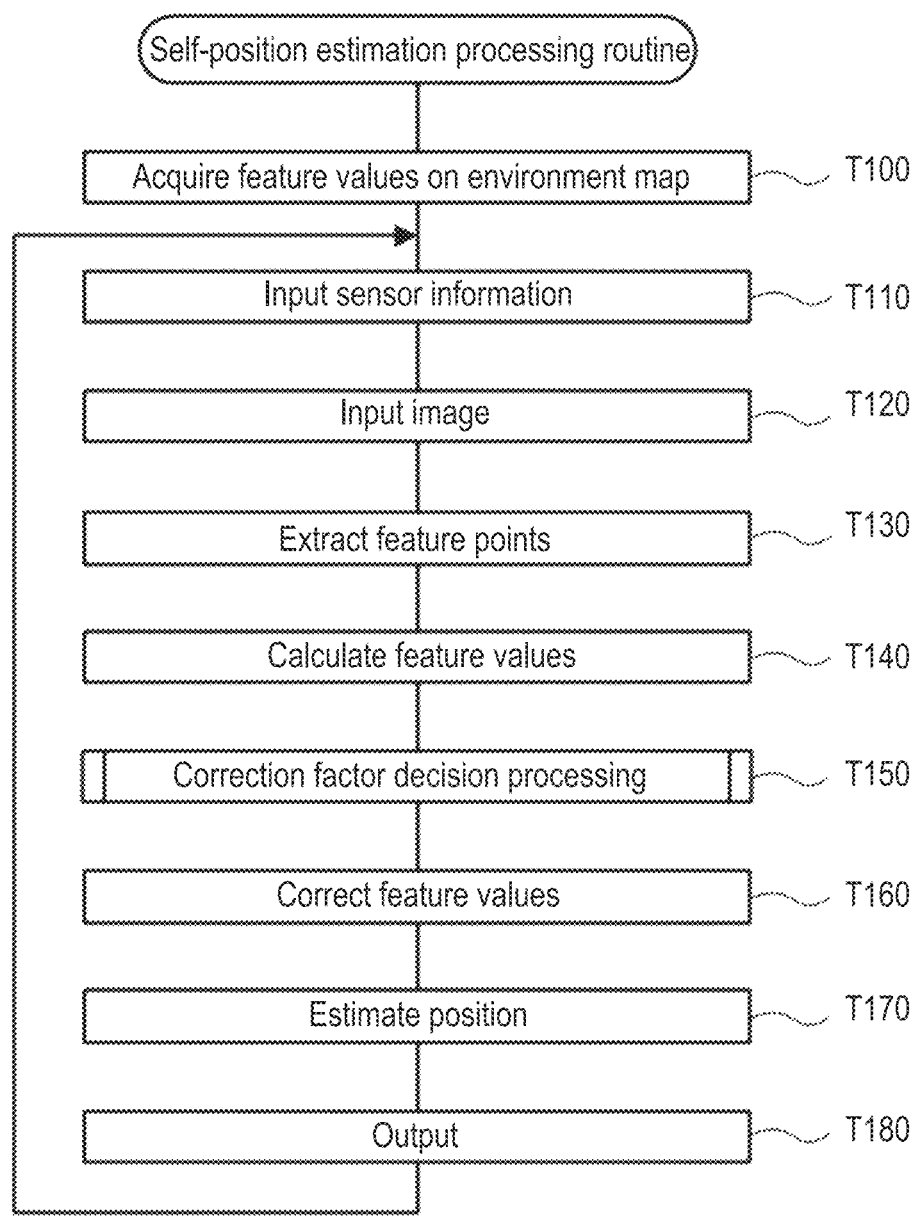
FIG. 15 is a flowchart illustrating a self-position estimation processing routine according to the third embodiment.

Next, an operation of a self-position estimation apparatus according to the third embodiment is explained with reference to FIG. 15. FIG. 15 shows a self-position estimation processing routine performed by the self-position estimation apparatus 300 according to the present embodiment.

First, at step T100, the correction factor decision unit 370 and the estimation unit 400 acquire the feature values on the environment map from the environment map feature value storage unit 410. The correction factor decision unit 370 also acquires the sunshine condition at the time the environment map is generated from the environment map feature value storage unit 410.

The sensor information input unit 340 inputs and receives brightness obtained by an illuminometer, three-dimensional positioning information obtained by a GPS, and time thereof at step T110.

The image input unit 310 receives an input of an image from the imaging device 210 at step T120.

The feature point extraction unit 320 extracts plural feature points from the image ahead of the vehicle captured by the imaging device 210 at step T130.

The feature value calculation unit 330 calculates the feature values based on luminance of the plural feature points at step T140.

At step T150, the correction factor decision unit 370 determines the feature value correction factor for correcting the feature value of each of the plural feature points extracted by the feature point extraction unit 320 so that such feature value is brought to a state where the feature point thereof is disposed in the illuminant direction in which the environment map is generated by acquiring and storing the feature values of the feature points of which positions are known, on a basis of the feature value of the feature point extracted by the feature point extraction unit 320, the estimated illuminant direction relative to the estimated imaging direction, and the illuminant direction relative to the imaging direction which is obtained beforehand at the time the feature value of the environment map is acquired.

The feature value correction unit 390 corrects the feature value of each of the plural feature points based on the feature value and the feature value correction factor which conforms to the pattern of the corresponding feature point (i.e., the shape thereof and the direction of the sun) at step T160.

The estimation unit 400 estimates the position of the vehicle (own vehicle) based on the corrected feature values of the plural feature points extracted by the feature point extraction unit 320 and the feature values of the plural feature points on the environment map at step T170.

The estimation unit 400 outputs the estimated vehicle position to the driving assist system 500. The process returns to step T110 to repeat the operations from step T110 to step T180.

Figure 16:
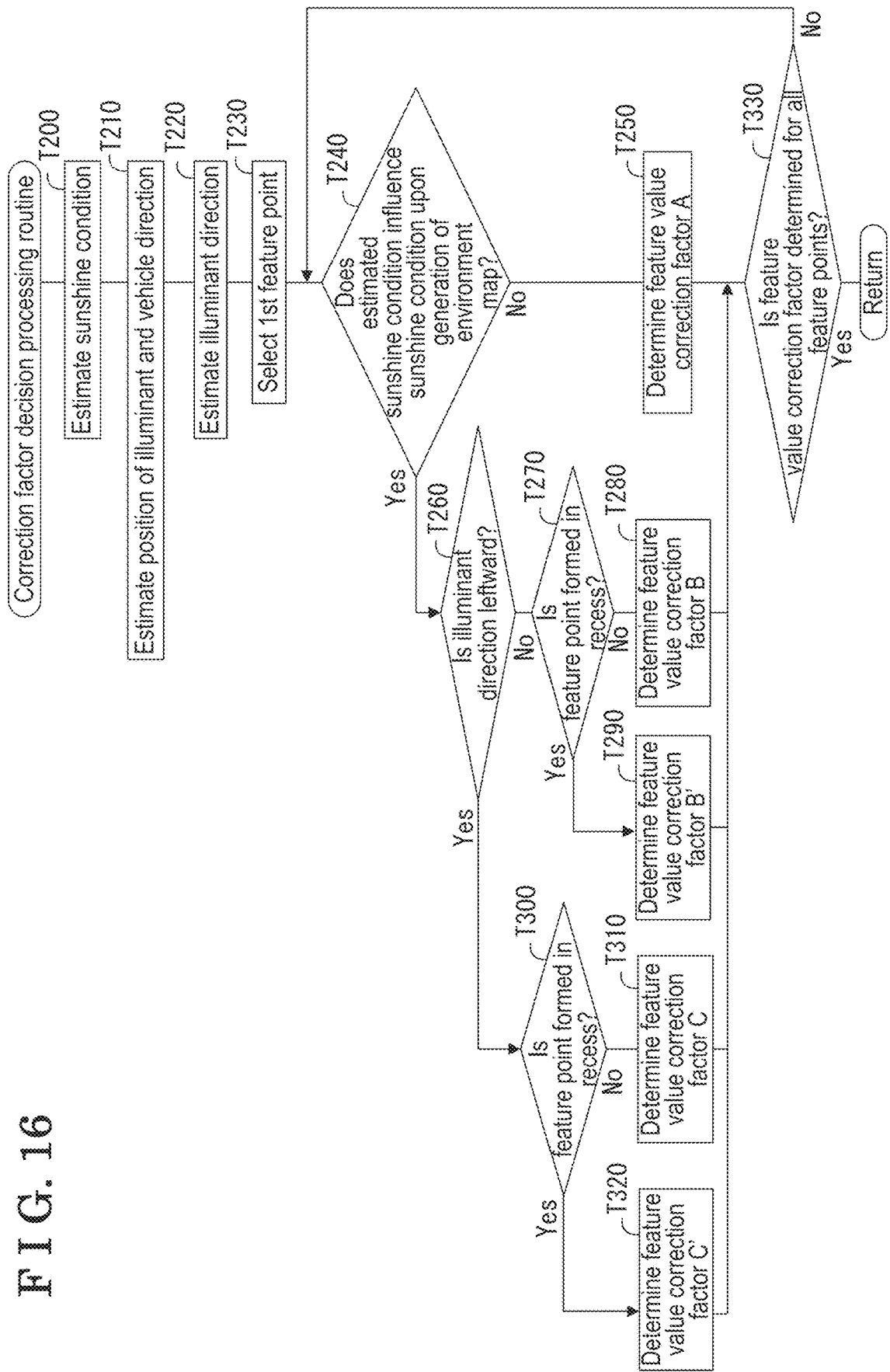
FIG. 16 is a flowchart illustrating a correction factor decision processing routine according to the third embodiment.

The aforementioned step T150 is realized by a correction factor decision processing routine as illustrated in FIG. 16.

At step T200, the sunshine condition estimation unit 360 estimates the sunshine condition of the vehicle based on brightness obtained by the sensor information.

The illuminant direction estimation unit 350 estimates the position of illuminant and the direction of the vehicle at the time the image is captured on a basis of the sensor information at step T210.

At step T220, the illuminant direction estimation unit 350 estimates the illuminant direction relative to the imaging direction at the time the image is captured on a basis of the estimated illuminant direction and imaging direction at the aforementioned step T210.

The correction factor decision unit 370 selects the first feature point at step T230.

The correction factor decision unit 370 determines whether or not the sunshine condition estimated at step T200 influences the sunshine condition at the time the environment map is generated at step T240.

In a case where the estimated sunshine condition is inhibited from influencing the sunshine condition at the time the environment map is generated (No at step T240), the correction factor decision unit 370 determines the feature value correction factor A as the feature value correction factor at step T250 and the process proceeds to step T330.

On the other hand, in a case where the estimated sunshine condition influences the sunshine condition at the time the environment map is generated (Yes at step T240), the correction factor decision unit 370 determines whether the direction of the sun relative to the imaging direction estimated at step T220 is at the right side or at the left side of the direction of the sun upon generation of the environment map at step T260.

In a case where the direction of the sun relative to the imaging direction is at the right side relative to the direction of the sun upon generation of the environment map (No at step T260), the correction factor decision unit 370 then determines whether or not the feature point is formed in recess at step T270.

In a case where the feature point is formed in protrusion (No at step T270), the correction factor decision unit 370 determines the feature value correction factor B as the feature value correction factor at step T280 and the process proceeds to step T330.

In a case where the feature point is formed in recess (Yes at step T270), the correction factor decision unit 370 determines the feature value correction factor B' as the feature value correction factor at step T290 and the process proceeds to step T330.

In a case where the direction of the sun relative to the imaging direction is at the left side relative to the direction of the sun upon generation of the environment map (Yes at step T260), the correction factor decision unit 370 then determines whether or not the feature point is formed in recess at step T300.

In a case where the feature point is formed in protrusion (No at step T300), the correction factor decision unit 370 determines the feature value correction factor C as the feature value correction factor at step T310 and the process proceeds to step T330.

In a case where the feature point is formed in recess (Yes at step T300), the correction factor decision unit 370 determines the feature value correction factor C' as the feature value correction factor at step T320 and the process proceeds to step T330.

At step T330, the correction factor decision unit 370 determines whether or not the feature value correction factor is determined for all the feature points.

In a case where the feature value correction factor is not determined for all of the feature points (No at step T330), the feature point for which the feature value correction factor is not determined is then selected. The process then returns to step T240.

In a case where the feature value correction factor is determined for all the feature points (Yes at step T330), the process returns.

As mentioned above, according to the self-position estimation apparatus of the third embodiment, the feature value correction factor for correcting the feature value of each of the plural feature points extracted by the feature point extraction unit 320 so that such feature value is brought to a state where the feature point thereof is disposed in the illuminant direction in which the environment map is generated by acquiring the feature values of the feature points, on a basis of the feature value of the feature point extracted by the feature point extraction unit 320, the estimated illuminant direction relative to the estimated imaging direction, and the illuminant direction relative to the imaging direction which is obtained beforehand at the time the feature value of the environment map is acquired. Then, the position of the vehicle is estimated on a basis of the corrected feature values of the plural feature points which are corrected on a basis of the feature values and the feature value correction values thereof, and the feature values of the plural feature points on the environment map. Therefore, even when the estimated illuminant direction is different from the illuminant direction at the time the feature values on the environment map are acquired, the position of the vehicle may be accurately estimated.

In the third embodiment, the feature values of the extracted feature points from the captured image are corrected. In a modified example of the third embodiment, the feature values of the feature points on the environment map are corrected.

In the modified example of the third embodiment, the feature value correction factor in a case where the estimated sunshine condition is inhibited from influencing the sunshine condition at the time the environment map is generated is determined in the same manner as the third embodiment. The feature value correction factors in other cases are determined as follows.

In a case where the estimated sunshine condition influences the sunshine condition at the time the environment map is generated, the feature value correction factor is determined for the feature value(s) of the feature point on the environment map on the assumption that the estimated direction of the sun is at the right side or the left side relative to the direction of the sun at the time the environment map is generated, and whether the feature point is formed in projection or recess.

For example, the feature value correction factor on the assumption that the direction of the sun relative to the imaging direction at the time the image is captured is at the right side as compared to the direction of the sun at the time the environment map is generated and the feature point is formed in the protrusion (i.e., the feature value correction factor B in FIG. 14) is determined for the feature value(s) of the feature point on the environment map.

In a case where both of the two regions (xa, xb) of 5-by-5 pixels on which the luminance calculation is performed for comparison so as to obtain the x-th bit of the feature value are positioned at the left side or the right side of the feature point, the value of the x-th sequence of the feature value correction factor is set to zero.

In a case where the region xa is positioned at the right side while the region xb is positioned at the left side, the regions xa and xb on which the luminance calculation is performed, the left side is darker (i.e., includes low luminance) when the direction of the sun relative to the imaging direction at the time the image is captured is at the right side as compared to the direction of the sun at the time the environment map is generated, and the feature point is the protrusion because the shadow is formed at the left side. That is, the luminance at the region xa is greater than the luminance at the region xb. Thus, the x-th bit of the feature value which is influenced by the sunshine condition is one (1).

At this time, as long as the x-th bit of the feature value of the feature point on the map is one, the correction of the feature value is not necessary. Thus, the value of the x-th sequence of the feature value correction factor is set to zero. On the other hand, in a case where the x-th bit of the feature value of the feature point on the map is zero, the x-th bit of the feature value of the feature point on the environment map should be corrected to one so that the value of the x-th sequence of the feature value correction factor is set to plus one (+1).

In a case where the region xa is positioned at the left side and the region xb is positioned at the right side, the luminance at the region xa is smaller than the luminance at the region xb when the direction of the sun relative to the imaging direction at the time the image is captured is at the right side as compared to the direction of the sun at the time the environment map is generated, and the feature point is the protrusion. The x-th bit of the feature value influenced by the sunshine condition is therefore zero.

At this time, as long as the x-th bit of the feature value of the feature point on the map is zero, the correction of the feature value is not necessary. Thus, the value of the x-th sequence of the feature value correction factor is set to zero. On the other hand, in a case where the x-th bit of the feature value of the feature point on the map is one, the x-th bit of the feature value of the feature point on the environment map should be corrected to zero so that the value of the x-th sequence of the feature value correction factor is set to minus one (−1).

The aforementioned operation is performed on all bits to thereby determine the feature value correction factor B.

In the same manner, the feature value correction factor B' is determined for a case where the direction of the sun relative to the imaging direction at the time the image is captured is at the right side as compared to the direction of the sun at the time the environment map is generated, and the feature point is the recess. The feature value correction factor C is determined for a case where the direction of the sun relative to the imaging direction at the time the image is captured is at the left side as compared to the direction of the sun at the time the environment map is generated, and the feature point is the protrusion. The feature value correction factor C' is determined for a case where the direction of the sun relative to the imaging direction at the time the image is captured is at the left side as compared to the direction of the sun at the time the environment map is generated, and the feature point is the recess.

Accordingly, various patterns of the feature value correction factors are determined so that, even when the estimated sunshine condition influences (for example, because of shadow) the sunshine condition at the time the environment map is generated, the feature value of the feature point on the environment map is correctable in view of such influence based on the direction of sun's rays to the two regions (points) which are compared to each other and the shape (protrusion, recess) of the feature point.

A construction of a self-position estimation system 60 according to the modified example of the third embodiment is explained below.

Figure 17:
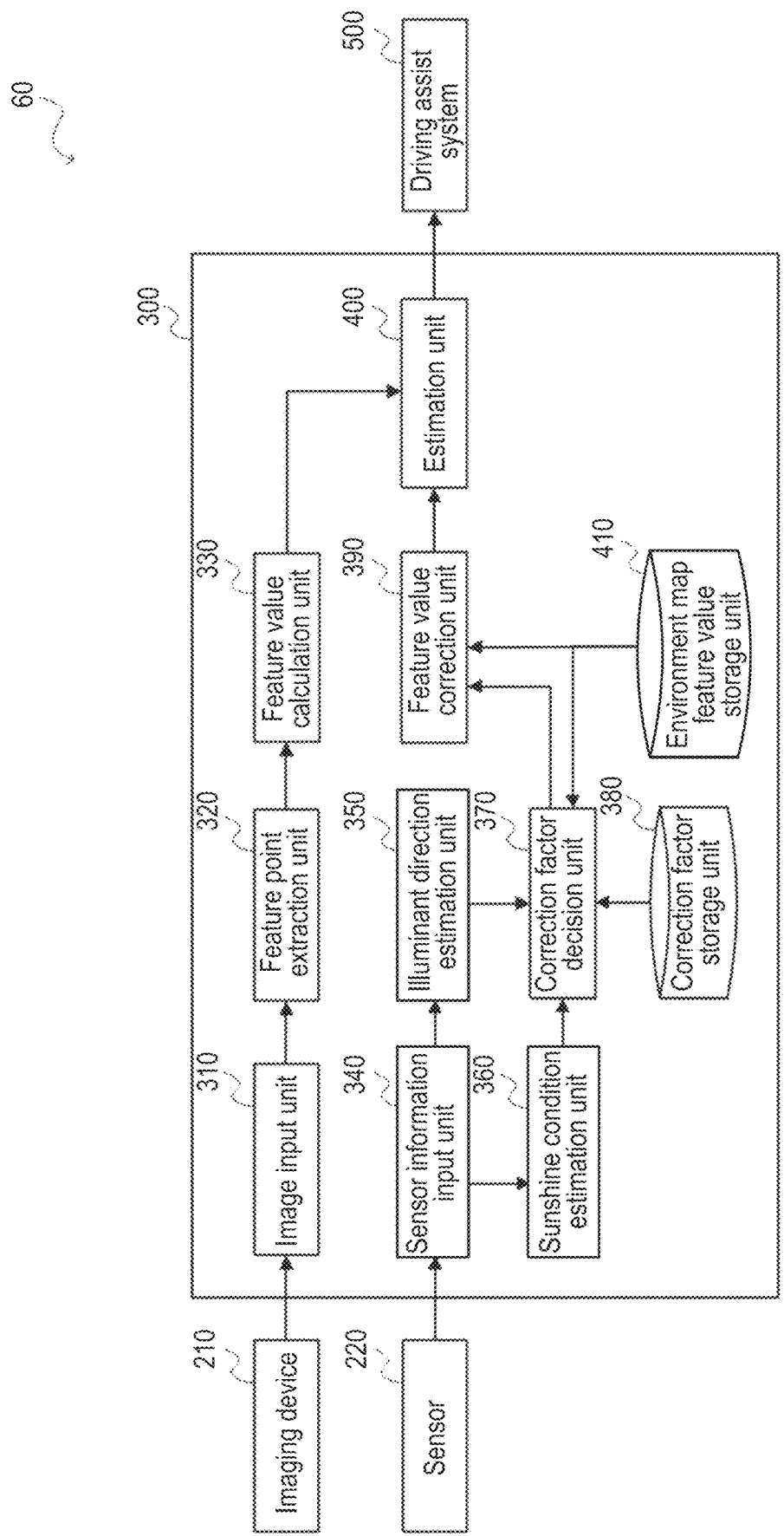
FIG. 17 is a block diagram illustrating a schematic configuration of a self-position estimation apparatus according to a modified example of the third embodiment.

FIG. 17 is a block diagram illustrating the self-position estimation apparatus 300 of the self-position estimation system 60 according to the modified example of the third embodiment.

The feature value calculation unit 330 calculates the feature values of the plural feature points based on luminance thereof.

Specifically, the feature value calculation unit 330 calculates the feature values of the plural feature points obtained from the feature point extraction unit 320. For example, the feature value calculation unit 330 calculates the feature values each in 32 bytes based on ORB features.

The feature value calculation unit 330 sends the calculated feature values to the estimation unit 400.

The feature value correction unit 390 corrects the feature values of the plural feature points based on the feature values of the feature points on the environment map and the respective feature value correction factors for the feature points.

The feature value correction unit 390 sends the corrected feature values on the environment map to the estimation unit 400.

The estimation unit 400 estimates the position of the vehicle based on the corrected feature values of the plural feature points on the environment map and the feature values of the plural feature points extracted by the feature point extraction unit 320.

Specifically, the estimation unit 400 estimates the position where the vehicle is located on the map by matching the corrected feature values of the plural feature points on the environment map and the feature values of the extracted plural feature points. For example, the estimation unit 400 determines a position corresponding to or a position with the feature value including the highest similarity between the corrected feature values on the environment map and the feature values of the plural feature points as an estimated vehicle position on the environment map.

The estimation unit 400 then outputs the estimated vehicle position to the driving assist system 500.

Figure 18:
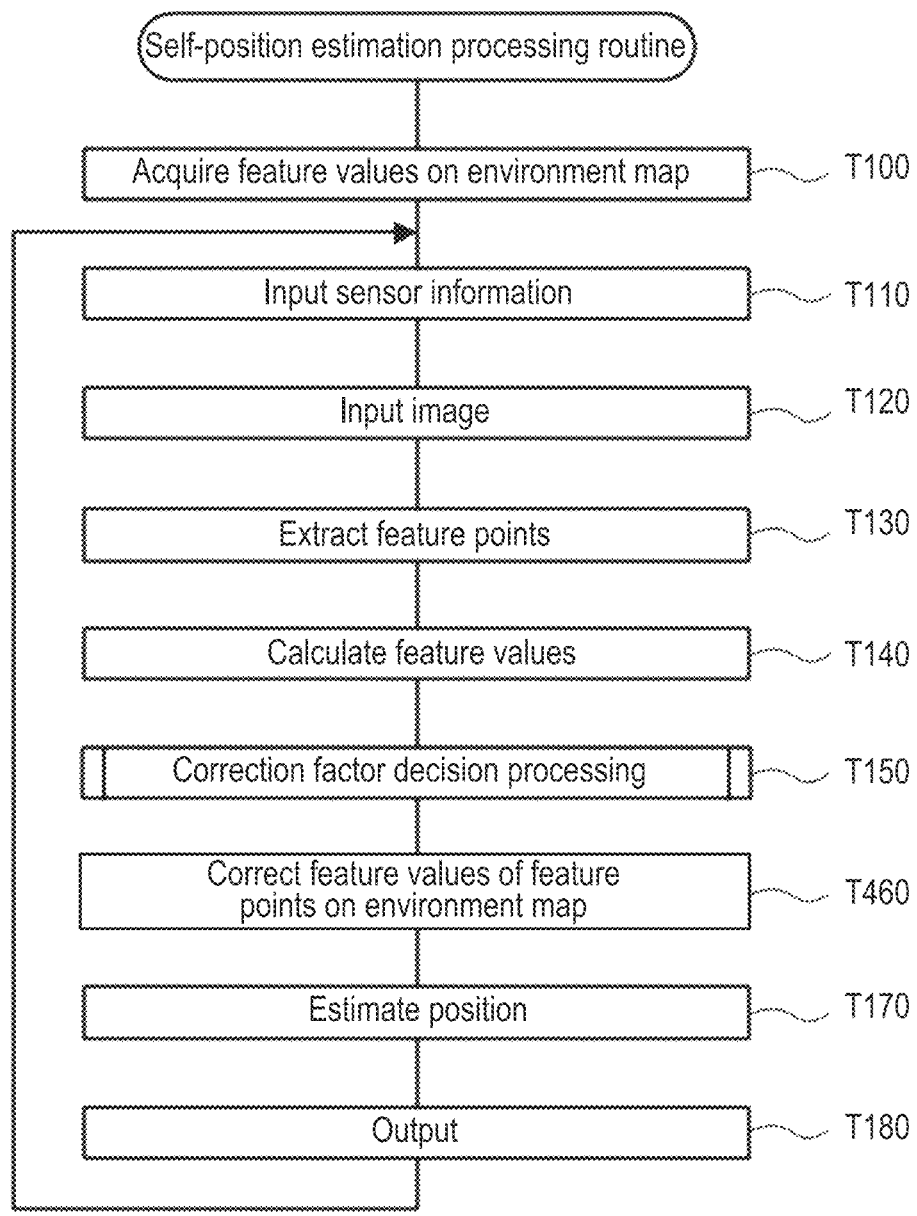
FIG. 18 is a flowchart illustrating a self-position estimation processing routine according to the modified example of the third embodiment.

An operation of the self-position estimation apparatus according to the modified example of the third embodiment is explained below. FIG. 18 is a flowchart illustrating a self-position estimation processing routine according to the modified example of the third embodiment.

At step T460, the feature value correction unit 390 corrects the feature value of each of the plural feature points on the environment map based on the feature value of the corresponding feature point on the environment map and the feature value correction factor for the corresponding feature point.

As mentioned above, according to the self-position estimation apparatus of the modified example of the third embodiment, the feature value correction factor for correcting the feature value of each of the feature points on the environment map is determined so that the feature value is brought to a state where the feature point thereof extracted by the feature point extraction unit 320 is disposed in the illuminant direction in which the environment map is generated by acquiring and storing the feature values of the feature points, on a basis of the feature value of the feature point extracted by the feature point extraction unit 320, the estimated illuminant direction relative to the estimated imaging direction, and the illuminant direction relative to the imaging direction which is obtained beforehand at the time the feature value of the environment map is acquired. Then, the position of the vehicle is estimated on a basis of the corrected feature values of the feature points which are corrected on a basis of the feature values and the feature value correction values thereof, and the feature values of the plural feature points extracted by the feature point extraction unit. Therefore, even when the estimated illuminant direction is different from the illuminant direction at the time the feature values on the environment map are acquired, the position of the vehicle may be accurately estimated.

The embodiments are not limited to include the above constructions and may be appropriately modified or changed.

In the aforementioned embodiments, the sunshine condition estimation unit 360 estimates whether or not shadow is formed by the illuminometer. Alternatively, whether or not shadow is formed may be estimated on a basis of input captured image. In this case, it may be estimated that the shadow is not formed in a case where a difference between an average luminance at a shadowed area and an average luminance at an area other than the shadowed area in any region is equal to or greater than a predetermined threshold value, for example.

In the aforementioned embodiments, the case where program is installed beforehand is explained. Alternatively, such program may be stored at a computer-readable storage medium to be provided, for example.

According to the aforementioned embodiments, a self-position estimation apparatus 10, 300 includes an image capturing unit 14, 210 capturing a plurality of driving images in a state where an own vehicle 50 is driven along a predetermined driving route and a plurality of reference images at a plurality of positions along the predetermined driving route, a detection unit 20, 320 detecting feature points on each of the plurality of driving images and feature points on each of the plurality of reference images correlated to each of the reference images, a storage unit 16 storing map information which includes the feature points on each of the plurality of reference images and a position and a posture of the image capturing unit 14, 210 at a time each of the plurality of reference images is captured by the image capturing unit 14, 210, and an estimation unit 24, 400 selecting a similar image similar to one of the plurality of driving images from the plurality of reference images to correlate the feature points on the one of the plurality of driving images and feature points on the similar image, the estimation unit 24, 400 estimating a position and a posture of the own vehicle 50 on the predetermined driving route based on a correlation result.

Accordingly, the self-position (own position) of the vehicle 50 may be accurately estimated on a basis of the correlation result of correlating the feature points on the driving image and the feature points on the similar image.

According to the embodiments, the self-position estimation apparatus 10, 300 further includes a calculation unit 22, 330 calculating at least one feature value of each of the feature points on each of the plurality of driving images detected by the detection unit 20, 320 and at least one feature value of each of the feature points on each of the plurality of reference images detected by the detection unit 20, 320. The estimation unit 24, 400 selects the similar image similar to one of the plurality of driving images from the plurality of reference images based on the feature values calculated by the calculation unit 22, 330.

Accordingly, because of calculation of the feature value of each of the feature points and selection of the similar image based on the calculation result, the similar image may be accurately selected even in a case where brightness in surroundings changes.

According to the first embodiment, the self-position estimation apparatus 10 further includes an addition unit 26 adding the feature value of each of the feature points on one of the plurality of driving images correlated to each of the feature points on the similar image by the estimation unit 24 to the map information as the feature value of each of the feature points on one of the plurality of reference images serving as the similar image.

Accordingly, the feature value of the feature point on the driving image is added and stored at the map information so as to be referred to at the time the self-position of the vehicle 50 is estimated.

According to the first embodiment, the estimation unit 24 calculates respective distances between a plurality of feature values registered for each of the feature points on the similar image and the feature value of each of the feature points on the driving image for correlating each of the feature points on the similar image and each of the feature points on the driving image to each other, the estimation unit correlating the feature point on the driving image and the feature point on the similar image in a case where a minimum value of calculated distances is equal to or smaller than a predetermined value.

Accordingly, the distance between the feature values may be easily fall to or below the predetermined value. The feature points between the similar image and the driving image may be correlated even when the feature value of the feature point on the driving image changes due to change of brightness in the surroundings.

According to the first embodiment, the addition unit 26 calculates distances between all pairs of the feature values of each of the feature points on the similar image selected from among the plurality of feature values registered for each of the feature points and the feature value to be added in a case where the number of the plurality of feature values registered for each of the feature points on the similar image reaches an upper limit, and deletes one of the feature values, a median of distances of the one of the feature values relative to the other of the feature values being the smallest among medians of the distances between the all pairs of the feature values.

Accordingly, the feature values of the feature points between the similar image and the driving image may be further accurately correlated to each other.

According to the first embodiment, the map information includes positions of the feature points detected from each of the plurality of reference images. The estimation unit 24 estimates the position and the posture of the own vehicle 50 on the predetermined driving route by estimating the position and the posture of the image capturing unit 14 based on positions of the feature points on the driving image and positions of the feature points on the similar image which are correlated to one another to convert the estimated position and posture of the image capturing unit 14 to a representative point X of the own vehicle 50.

Accordingly, because the position and the posture of the image capturing unit 14 are converted to the representative point X of the vehicle 50 with less calculation, the position of the vehicle 50 while the vehicle 50 is being driven is estimated for a short time period, which may decrease a delay time of a vehicle operation control.

According to the first embodiment, the estimation unit 24 estimates the position and the posture of the image capturing unit 14 at which a sum of projection differences which is expressed as differences between respective positions of the feature points on the driving image and respective positions of projection points that are obtained by projecting the feature points on the similar image to the driving image based on the position and the posture of the image capturing unit 14 at the time the similar image is captured is minimum.

Accordingly, because the sum of projection differences is the smallest, the position and the posture of the own vehicle 50 may be accurately estimated.

According to the first embodiment, the addition unit 26 selectively additionally registers, to the map information, the feature value of the feature point of which the projection difference is equal to or smaller than a predetermined value among the feature points on the driving image correlated to the feature points on the similar image by the estimation unit 24.

Accordingly, the position and the posture of the own vehicle 50 may be accurately estimated with less wrong correlation.

According to the second embodiment, the feature points on each of the reference images detected by the detection unit 20 serve as environment feature points in an environment along the predetermined driving route.

Accordingly, because the feature points on the reference image serve as the environment feature points, the feature points on the image may be reduced, which decreases an extraction time of the feature points.

According to the second embodiment, the self-position estimation apparatus 10 further includes a setting unit 12 estimating a road surface gradient difference of the predetermined driving route and setting a detection range As of correlation feature points on each of the plurality of driving images correlated to the environment feature points based on the estimated road surface gradient difference, the setting unit 12 selecting the similar image similar to one of the plurality of driving images from the plurality of reference images based on the correlation feature points detected at the detection range.

Accordingly, even when distribution of the feature points on the entire captured image is biased or uneven due to gradient of the road surface, the self-position of the vehicle 50 may be estimated.

According to the second embodiment, the map information includes feature values indicating respective features of the environment feature points. The estimation unit 24 selects the similar image from the plurality of reference images, the similar image including the greatest number of environment feature points correlated to the correlation feature points on the driving image, the estimation unit 24 correlating the environment feature points and the correlation feature points by comparing the feature values of the correlation feature points and the feature values of the environment feature points.

Accordingly, the reference image is selected on the basis of the feature values of the environment feature points, so that the environment feature points and the correlation feature points may be accurately correlated to one another.

According to the second embodiment, the image capturing unit 14 is fixed to a predetermined position of the own vehicle 50 to capture an image of a predetermined region ahead of the image capturing unit 14. The setting unit 12 selects from the plurality of reference images the similar image which is the most similar to the predetermined region ahead of the image capturing unit 14 and estimates the road surface gradient difference from a difference between a road surface gradient based on the position and the posture of the image capturing unit 14 correlated to the selected similar image and a road surface gradient based on the position and the posture of the image capturing unit 14 estimated on the driving image which is previously captured.

Accordingly, the road surface gradient may be estimated with less calculation.

According to the second embodiment, the setting unit 12 moves the detection range As in an up and down direction on the driving image based on the road surface gradient difference.

Accordingly even with a large difference in road surface gradient, the self-position of the vehicle may be accurately estimated.

According to the second embodiment, the setting unit 12 specifies a position of the detection range As on the driving image to an upper side with an increase of a road surface gradient of a position of the own vehicle 50 as compared to a road surface gradient of the predetermined region.

Accordingly, because the detection range is limited on a basis of the road surface gradient difference, the self-position of the vehicle may be estimated with less calculation.

According to the third embodiment, a self-position estimation apparatus 300 estimating a position of an own vehicle with an environment map storing a feature value of each of a plurality of feature points of which positions are known, the self-position estimation apparatus 300 includes a feature point extraction unit 320 extracting a plurality of feature points from an image which captures surroundings of the own vehicle, a feature value calculation unit 330 calculating a feature value of each of the plurality of feature points extracted by the feature point extraction unit 320, the feature value being based on luminance of each of the plurality of feature points, an illuminant direction estimation unit 350 estimating an illuminant direction relative to an imaging direction at a time the image is captured on a basis of sensor information, a correction factor decision unit 370 deciding a feature value correction factor for correcting the feature value of each of the plurality of feature points extracted by the feature point extraction unit 320 so that the feature value is brought to a state where the feature point thereof extracted by the feature point extraction unit 320 is disposed in an illuminant direction in which the environment map is generated by acquiring the feature value of each of the plurality of feature points, on a basis of the feature value of each of the plurality of feature points extracted by the feature point extraction unit 320, the estimated illuminant direction, and the illuminant direction obtained beforehand when the feature value of each of the plurality of feature points on the environment map is acquired, a feature value correction unit 390 correcting the feature value of each of the plurality of feature points extracted by the feature point extraction unit 320 based on the feature value of each of the plurality of feature points extracted by the feature point extraction unit 320 and the feature value correction factor for each of the plurality of feature points, and an estimation unit 400 estimating a position of the own vehicle based on the corrected feature value for each of the plurality of feature points extracted by the feature point extraction unit 320 and the feature value of each of the plurality of feature points on the environment map.

Accordingly, even when the estimated illuminant direction is different from the illuminant direction at the time the feature value of each of the feature points on the environment map is acquired, the self-position of the vehicle may be estimated with less calculation.

According to the modified example of the third embodiment, a self-position estimation apparatus 300 estimating a position of an own vehicle with an environment map storing a feature value of each of a plurality of feature points of which positions are known, the self-position estimation apparatus 300 includes a feature point extraction unit 320 extracting a plurality of feature points from an image which captures surroundings of the own vehicle, a feature value calculation unit 330 calculating a feature value of each of the plurality of feature points extracted by the feature point extraction unit 320, the feature value being based on luminance of each of the plurality of feature points, an illuminant direction estimation unit 350 estimating an illuminant direction relative to an imaging direction at a time the image is captured on a basis of sensor information, a correction factor decision unit 370 deciding a feature value correction factor for correcting the feature value of each of the plurality of feature points on the environment map so that the feature value is brought to a state where the feature point thereof extracted by the feature point extraction unit 320 is disposed in an illuminant direction in which the environment map is generated by acquiring the feature value of each of the plurality of feature points, on a basis of the feature value of each of the plurality of feature points extracted by the feature point extraction unit 320, the estimated illuminant direction, and the illuminant direction obtained beforehand when the feature value of each of the plurality of feature points on the environment map is acquired, a feature value correction unit 390 correcting the feature value of each of the plurality of feature points on the environment map based on the feature value of each of the plurality of feature points on the environment map and the feature value correction factor for each of the plurality of feature points, and an estimation unit 400 estimating a position of the own vehicle based on the corrected feature value for each of the plurality of feature points on the environment map and the feature value of each of the plurality of feature points extracted by the feature point extraction unit 320.

Accordingly, even when the estimated illuminant direction is different from the illuminant direction at the time the feature value of each of the feature points on the environment map is acquired, the self-position of the vehicle may be estimated with less calculation.

According to the third embodiment and the modified example of the third embodiment, the self-position estimation apparatus 300 further includes a sunshine condition estimation unit 360 estimating a sunshine condition of the own vehicle based on brightness obtained from the sensor information. The correction factor decision unit 370 decides the feature value correction factor for correcting the feature value of each of the plurality of feature points based on the feature value of each of the plurality of feature points, the estimated illuminant direction, and the illuminant direction obtained beforehand when the feature value of the environment map is acquired in a case where the sunshine condition obtained by the sunshine condition estimation unit 360 influences the feature value of each of the feature points because of a difference of the illuminant direction.

Accordingly, the self-position of the vehicle may be estimated with less calculation based on the sunshine condition.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A self-position estimation apparatus comprising:
an image capturing unit capturing a plurality of driving images in a state where an own vehicle is driven along a predetermined driving route and a plurality of reference images at a plurality of positions along the predetermined driving route;
a detection unit detecting feature points on each of the plurality of driving images and feature points on each of the plurality of reference images correlated to each of the reference images;
a storage unit storing map information which includes the feature points on each of the plurality of reference images and a position and a posture of the image capturing unit at a time each of the plurality of reference images is captured by the image capturing unit;
an estimation unit selecting a similar image similar to one of the plurality of driving images from the plurality of reference images to correlate the feature points on the one of the plurality of driving images and feature points on the similar image, the estimation unit estimating a position and a posture of the own vehicle on the predetermined driving route based on a correlation result, the feature points on each of the reference images detected by the detection unit serve as environment feature points in an environment along the predetermined driving route; and
a setting unit estimating a road surface gradient difference of the predetermined driving route and setting a detection range (As) of correlation feature points on each of the plurality of driving images correlated to the environment feature points based on the estimated road surface gradient difference, the setting unit selecting the similar image similar to one of the plurality of driving images from the plurality of reference images based on the correlation feature points detected at the detection range,
wherein the image capturing unit is fixed to a predetermined position of the own vehicle to capture an image of a predetermined region ahead of the image capturing unit,
the setting unit selects from the plurality of reference images the similar image which is the most similar to the predetermined region ahead of the image capturing unit and estimates the road surface gradient difference from a difference between a road surface gradient based on the position and the posture of the image capturing unit correlated to the selected similar image and a road surface gradient based on the position and the posture of the image capturing unit estimated on the driving image which is previously captured, and
the detection range is limited to only a portion of an entirety of the image of the predetermined region.

2. The self-position estimation apparatus according to claim 1, further comprising a calculation unit calculating at least one feature value of each of the feature points on each of the plurality of driving images detected by the detection unit and at least one feature value of each of the feature points on each of the plurality of reference images detected by the detection unit, wherein the estimation unit selects the similar image similar to one of the plurality of driving images from the plurality of reference images based on the feature values calculated by the calculation unit.

3. The self-position estimation apparatus according to claim 2, further comprising an addition unit adding the feature value of each of the feature points on one of the plurality of driving images correlated to each of the feature points on the similar image by the estimation unit to the map information as the feature value of each of the feature points on one of the plurality of reference images serving as the similar image.

4. The self-position estimation apparatus according to claim 1, wherein the estimation unit calculates respective distances between a plurality of feature values registered for each of the feature points on the similar image and the feature value of each of the feature points on the driving image for correlating each of the feature points on the similar image and each of the feature points on the driving image to each other, the estimation unit correlating the feature point on the driving image and the feature point on the similar image in a case where a minimum value of calculated distances is equal to or smaller than a predetermined value.

5. The self-position estimation apparatus according to claim 3, wherein the addition unit calculates distances between all pairs of the feature values of each of the feature points on the similar image selected from among the plurality of feature values registered for each of the feature points and the feature value to be added in a case where the number of the plurality of feature values registered for each of the feature points on the similar image reaches an upper limit, and deletes one of the feature values, a median of distances of the one of the feature values relative to the other of the feature values being the smallest among medians of the distances between the all pairs of the feature values.

6. The self-position estimation apparatus according to claim 1, wherein
the map information includes positions of the feature points detected from each of the plurality of reference images,
the estimation unit estimates the position and the posture of the own vehicle on the predetermined driving route by estimating the position and the posture of the image capturing unit based on positions of the feature points on the driving image and positions of the feature points on the similar image which are correlated to one another to convert the estimated position and posture of the image capturing unit to a representative point of the own vehicle.

7. The self-position estimation apparatus according to claim 6, wherein the estimation unit estimates the position and the posture of the image capturing unit at which a sum of projection differences which is expressed as differences between respective positions of the feature points on the driving image and respective positions of projection points that are obtained by projecting the feature points on the similar image to the driving image based on the position and the posture of the image capturing unit at the time the similar image is captured is minimum.

8. The self-position estimation apparatus according to claim 7, wherein the addition unit selectively additionally registers, to the map information, the feature value of the feature point of which the projection difference is equal to or smaller than a predetermined value among the feature points on the driving image correlated to the feature points on the similar image by the estimation unit.

9. The self-position estimation apparatus according to claim 1, wherein the map information includes feature values indicating respective features of the environment feature points, the estimation unit selects the similar image from the plurality of reference images, the similar image including the greatest number of environment feature points correlated to the correlation feature points on the driving image, the estimation unit correlating the environment feature points and the correlation.

10. The self-position estimation apparatus according to claim 1, wherein the image capturing unit is fixed to a predetermined position of the own vehicle to capture an image of a predetermined region ahead of the image capturing unit, the setting unit selects from the plurality of reference images the similar image which is the most similar to the predetermined region ahead of the image capturing unit and estimates the road surface gradient difference from a difference between a road surface gradient based on the position and the posture of the image capturing unit correlated to the selected similar image and a road surface gradient based on the position and the posture of the image capturing unit estimated on the driving image which is previously captured.

11. The self-position estimation apparatus according to claim 10, wherein the setting unit specifies a position of the detection range (As) on the driving image to an upper side with an increase of a road surface gradient of a position of the own vehicle as compared to a road surface gradient of the predetermined region.

* * * * *